US011233995B2

(12) United States Patent
Zhang et al.

(10) Patent No.: US 11,233,995 B2
(45) Date of Patent: Jan. 25, 2022

(54) TEMPORAL PREDICTION OF PARAMETERS IN NON-LINEAR ADAPTIVE LOOP FILTER

(71) Applicants: Beijing Bytedance Network Technology Co., Ltd., Beijing (CN); Bytedance Inc., Los Angeles, CA (US)

(72) Inventors: Li Zhang, San Diego, CA (US); Kai Zhang, San Diego, CA (US); Hongbin Liu, Beijing (CN); Yue Wang, Beijing (CN)

(73) Assignees: BEIJING BYTEDANCE NETWORK TECHNOLOGY CO., LTD., Beijing (CN); BYTEDANCE INC., Los Angeles, CA (US)

( * ) Notice: Subject to any disclaimer, the term of this patent is extended or adjusted under 35 U.S.C. 154(b) by 0 days.

(21) Appl. No.: 17/392,628

(22) Filed: Aug. 3, 2021

(65) Prior Publication Data

US 2021/0368171 A1 Nov. 25, 2021

Related U.S. Application Data

(63) Continuation of application No. PCT/CN2020/084876, filed on Apr. 15, 2020.

(30) Foreign Application Priority Data

Apr. 15, 2019 (WO) ................ PCT/CN2019/082626

(51) Int. Cl.
*H04B 1/66* (2006.01)
*H04N 7/12* (2006.01)
(Continued)

(52) U.S. Cl.
CPC ......... *H04N 19/117* (2014.11); *H04N 19/119* (2014.11); *H04N 19/132* (2014.11);
(Continued)

(58) Field of Classification Search
CPC ............................ H04N 19/117; H04N 19/82
See application file for complete search history.

(56) References Cited

U.S. PATENT DOCUMENTS

| 8,929,462 B2 | 1/2015 | Wang et al. |
| 9,591,331 B2 | 3/2017 | Chong et al. |

(Continued)

FOREIGN PATENT DOCUMENTS

| CN | 106031172 A | 10/2016 |
| CN | 107909618 A | 4/2018 |

(Continued)

OTHER PUBLICATIONS

Chen et al. "Algorithm Description of Joint Exploration Test Model 7 (JEM 7)," Joint Video Exploration Team (JVET) of ITU-T SG 16 WP 3 and ISO/IEC JTC 1/SC 29/WG 11, 7th Meeting: Torino, IT, Jul. 13-21, 2017, document JVET-G1001, 2017.

(Continued)

*Primary Examiner* — Fabio S Lima
(74) *Attorney, Agent, or Firm* — Perkins Coie LLP

(57) ABSTRACT

Devices, systems and methods for temporal prediction of parameters in non-linear adaptive loop filtering are described. In an exemplary aspect, a method for visual media processing includes configuring, for a current video block, one or more parameters of a clipping operation that is part of a non-linear filtering operation; and performing, based on the one or more parameters, a conversion between the current video block and a bitstream representation of the current video block, wherein the one or more parameters is coded in accordance with a rule.

20 Claims, 17 Drawing Sheets

(51) Int. Cl.

| | | |
|---|---|---|
| *H04N 11/02* | (2006.01) | |
| *H04N 11/04* | (2006.01) | |
| *H04N 19/117* | (2014.01) | |
| *H04N 19/70* | (2014.01) | |
| *H04N 19/119* | (2014.01) | |
| *H04N 19/176* | (2014.01) | |
| *H04N 19/132* | (2014.01) | |
| *H04N 19/174* | (2014.01) | |

(52) U.S. Cl.
CPC ......... *H04N 19/174* (2014.11); *H04N 19/176* (2014.11); *H04N 19/70* (2014.11)

(56) References Cited

U.S. PATENT DOCUMENTS

| | | | |
|---|---|---|---|
| 9,813,719 | B2 | 11/2017 | Wang |
| 10,057,574 | B2 | 8/2018 | Li et al. |
| 10,271,052 | B2 | 4/2019 | Zhang et al. |
| 10,277,909 | B2 | 4/2019 | Ye et al. |
| 10,404,988 | B2 | 9/2019 | Ye et al. |
| 10,506,230 | B2 | 12/2019 | Zhang et al. |
| 10,582,213 | B2 | 3/2020 | Li et al. |
| 10,694,202 | B2 | 6/2020 | Zhang et al. |
| 10,694,204 | B2 | 6/2020 | Chen et al. |
| 10,721,469 | B2 | 7/2020 | Zhang et al. |
| 10,764,576 | B2 | 9/2020 | Li et al. |
| 10,778,974 | B2 | 9/2020 | Karczewicz et al. |
| 10,855,985 | B2 | 12/2020 | Zhang et al. |
| 2007/0058713 | A1 | 3/2007 | Shen et al. |
| 2008/0239090 | A1 | 10/2008 | Ohwaki et al. |
| 2009/0116558 | A1 | 5/2009 | Chen et al. |
| 2011/0142136 | A1 | 6/2011 | Liu et al. |
| 2013/0107973 | A1 | 5/2013 | Wang et al. |
| 2013/0258049 | A1* | 10/2013 | Chong .................. H04N 19/80 348/42 |
| 2015/0049821 | A1 | 2/2015 | Chen et al. |
| 2016/0212002 | A1 | 7/2016 | Xiong et al. |
| 2016/0366422 | A1 | 12/2016 | Yin et al. |
| 2017/0238020 | A1 | 8/2017 | Karczewicz et al. |
| 2018/0041778 | A1 | 2/2018 | Zhang et al. |
| 2018/0041779 | A1 | 2/2018 | Zhang et al. |
| 2019/0238845 | A1 | 8/2019 | Zhang et al. |
| 2019/0306502 | A1 | 10/2019 | Gadde et al. |
| 2020/0177910 | A1 | 6/2020 | Li et al. |
| 2020/0267381 | A1 | 8/2020 | Vanam et al. |
| 2020/0304785 | A1* | 9/2020 | Hu ........................ H04N 19/105 |
| 2020/0314423 | A1* | 10/2020 | Hu .......................... H04N 19/86 |
| 2020/0322632 | A1 | 10/2020 | Hanhart et al. |
| 2020/0359016 | A1 | 11/2020 | Li et al. |
| 2020/0359017 | A1 | 11/2020 | Li et al. |
| 2020/0359018 | A1 | 11/2020 | Li et al. |
| 2020/0413038 | A1 | 12/2020 | Zhang et al. |
| 2021/0044834 | A1 | 2/2021 | Li et al. |
| 2021/0084295 | A1* | 3/2021 | Chen .................... H04N 19/117 |
| 2021/0084318 | A1 | 3/2021 | Kuo et al. |
| 2021/0211657 | A1* | 7/2021 | Ikonin .................. H04N 19/184 |
| 2021/0274170 | A1* | 9/2021 | Du ........................ H04N 19/176 |

FOREIGN PATENT DOCUMENTS

| | | | | |
|---|---|---|---|---|
| WO | 2014007735 | A1 | 1/2014 | |
| WO | 2017194312 | A2 | 11/2017 | |
| WO | WO-2020182620 | A1 * | 9/2020 | ........... H04N 19/186 |
| WO | WO-2020200277 | A1 * | 10/2020 | ............. H04N 19/70 |

OTHER PUBLICATIONS

Chen et al. "CE5-1: Adaptive Loop Fitter with Virtual Boundary Processing," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0088,2019.

"Information Technology—High Efficiency Coding and Media Delivery in Heterogeneous Environments—Part 2: High Efficiency Video Coding" Apr. 20, 2018, ISO/DIS 23008, 4th Edition.

Karczewicz et al. "Geometry Tranformation-based Adaptive In-Loop Filter," 2016, IEEE Qualcomm Technologies Inc. San Diego, CA, USA.

Lim et al. "CE2: Subsampled Laplacian Calculation (Test 6.1, 6.2, 6.3, and 6.4)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0147, 2018.

Lin et al. "CE13: HEC with In-Loop Filters Using Spherical Neighbors (Test 1.3)," Joint Video Experts Team (JVET) of ITU-T SG 16 WP 3 and ISO/IEC JTC 1/SC 29/WG 11, 13th Meeting, Marrakech, MA, Jan. 9-18, 2019, document JVET-M0363, 2019.

Rasch et al. "CE10: Uniform Directional Diffusion Filters for Video Coding," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0157, 2018.

Rusanovskyy et al. "CE14: Test on In-Loop Bilateral Filter From JVET-J0021/JVET-K0384 with Parametrization (CE14.2)," Joint Video Experts Team (JVET) of ITU-T SG 16 WP 3 and ISO/IEC JTC 1/SC 29/WG 11, 12th Meeting, Macao, CN, Oct. 3-12, 2018, document JVET-L0406,2018.

Stepin et al. "CE2 Related: Hadamard Transform Domain Filter," Joint Video Expters Team (JVET) of ITU-T SG 16 and ISO/IEC JTC 1/SC 29/WG 11, 11th Meeting, Ljubljana, SI, Jul. 10-18, 2018, document JVET-K0068, 2018.

Taquet et al. "Non-Linear Adaptive Loop Filter," Joint Video Experts Team (JVET) of ITU-T SG 16 WP 3 and ISO-IEC JTC 1/SC 29/WG 11, 13th Meeting, Marrakech, MA, Jan. 9-8, 2019, document JVET-M0385, 2019.

Taquet et al. "CE5: Results of Tests CE5-3.1 to CE5-3.4 on Non-Linear Adaptive Filter," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0242, 2019.

Taquet et al. "CE5: Complementary Results of Tests CE5-3 on Non-Linear ALF," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0243, 2019.

Zhao et al. "CE3-Related: Harmonization Between ISP and WAIP," Joint Video Experts Team (JVET) of ITU-T SG 16 WP 3 and ISO/IEC JTC 1/SC 29/WG 11, 14th Meeting, Geneva, CH, Mar. 19-27, 2019, document JVET-N0427, 2019.

International Search Report and Written Opinion from International Patent Application No. PCT/CN2020/084873 dated Jun. 29, 2020 (10 pages).

International Search Report and Written Opinion from International Patent Application No. PCT/CN2020/084876 dated Jun. 30, 2020 (10 pages).

Non Final Office Action from U.S. Appl. No. 17/392,581 dated Oct. 26, 2021.

* cited by examiner

TEMPORAL PREDICTION OF PARAMETERS IN NON-LINEAR ADAPTIVE LOOP FILTER

CROSS REFERENCE TO RELATED APPLICATIONS

This application is a continuation of International Patent Application No. PCT/CN2020/084876, filed on Apr. 15, 2020, which claims the priority to and benefits of International Patent Application No. PCT/CN2019/082626, filed on Apr. 15, 2019. All the aforementioned patent applications are hereby incorporated by reference in their entireties.

TECHNICAL FIELD

This patent document relates to video coding and decoding techniques, devices and systems.

BACKGROUND

In spite of the advances in video compression, digital video still accounts for the largest bandwidth use on the internet and other digital communication networks. As the number of connected user devices capable of receiving and displaying video increases, it is expected that the bandwidth demand for digital video usage will continue to grow.

SUMMARY

Devices, systems and methods related to digital video coding, and specifically, to temporal prediction of parameters in non-linear adaptive loop filtering are described. The described methods may be applied to both the existing video coding standards (e.g., High Efficiency Video Coding (HEVC)) and future video coding standards (e.g., Versatile Video Coding (VVC)) or codecs.

In one representative aspect, the disclosed technology may be used to provide a method for visual media processing. This method includes configuring, for a current video block, one or more parameters of a clipping operation that is part of a non-linear filtering operation; and performing, based on the one or more parameters, a conversion between the current video block and a bitstream representation of the current video block, wherein the one or more parameters is coded in accordance with a rule.

In another representative aspect, the disclosed technology may be used to provide a method for visual media processing. This method includes determining, based on a characteristic of a current video block, one or more parameters of a non-linear filtering operation; and performing, based on the one or more parameters, a conversion between the current video block and a bitstream representation of the current video block.

In yet another representative aspect, the disclosed technology may be used to provide a method for visual media processing. This method includes configuring, for a current video block, one or more parameters of a clipping operation that is part of a non-linear filtering operation; and performing, based on the one or more parameters, a conversion between the current video block and a bitstream representation of the current video block, wherein the one or more parameters are presented in the bitstream representation independently from values of at least one filter coefficient associated with the non-linear filtering operation.

In yet another representative aspect, the disclosed technology may be used to provide a method for visual media processing. This method includes configuring, for a current video block, one or more parameters of a clipping operation that is part of a non-linear filtering operation; and performing, based on the one or more parameters, a conversion between the current video block and a bitstream representation of the current video block, wherein the current video block inherits filter coefficients from an i-th filter, and wherein a first rule associated with inheritance of the one or more parameters of the clipping operation is different from a second rule associated with inheritance of the filter coefficients.

In yet another representative aspect, the above-described method is embodied in the form of processor-executable code and stored in a computer-readable program medium.

In yet another representative aspect, a video encoder apparatus may implement a method as described herein.

In yet another representative aspect, a video decoder apparatus may implement a method as described herein.

The above and other aspects and features of the disclosed technology are described in greater detail in the drawings, the description and the claims.

BRIEF DESCRIPTION OF THE DRAWINGS

Figures 4A, 4B:
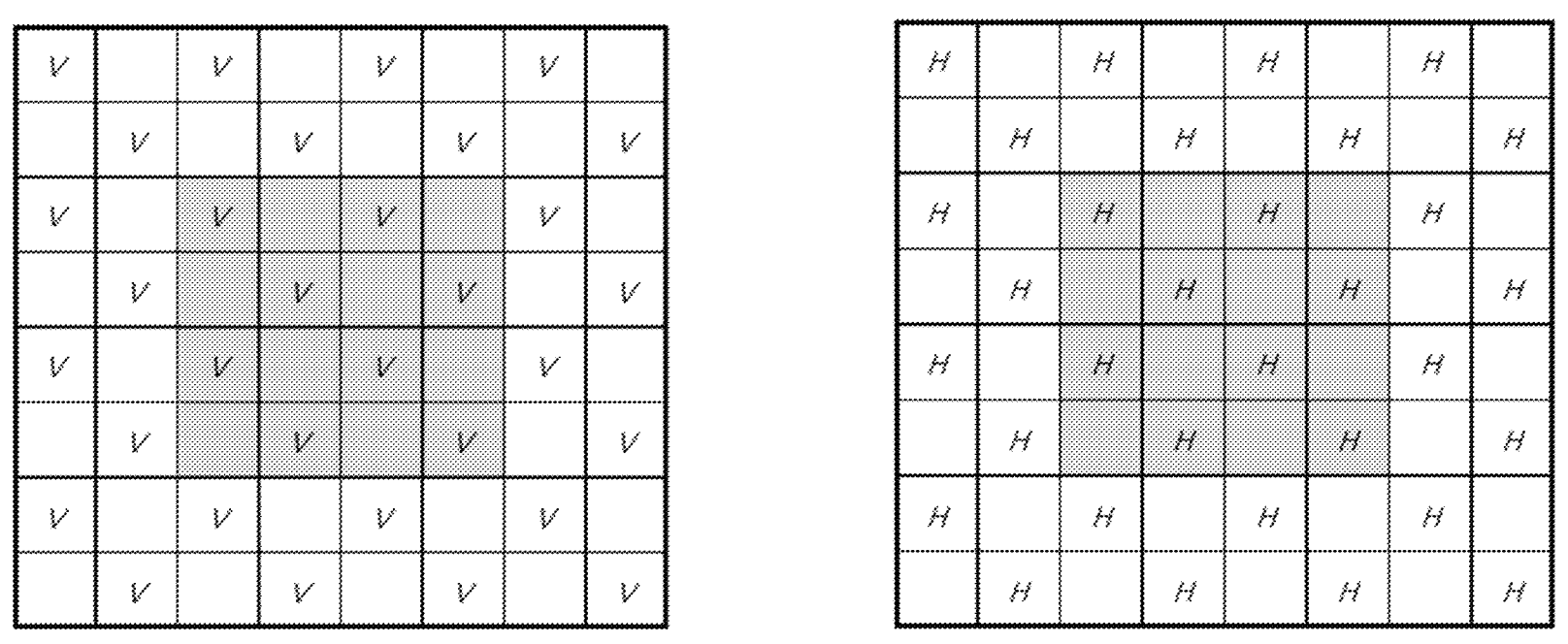
Figures 4C, 4D:
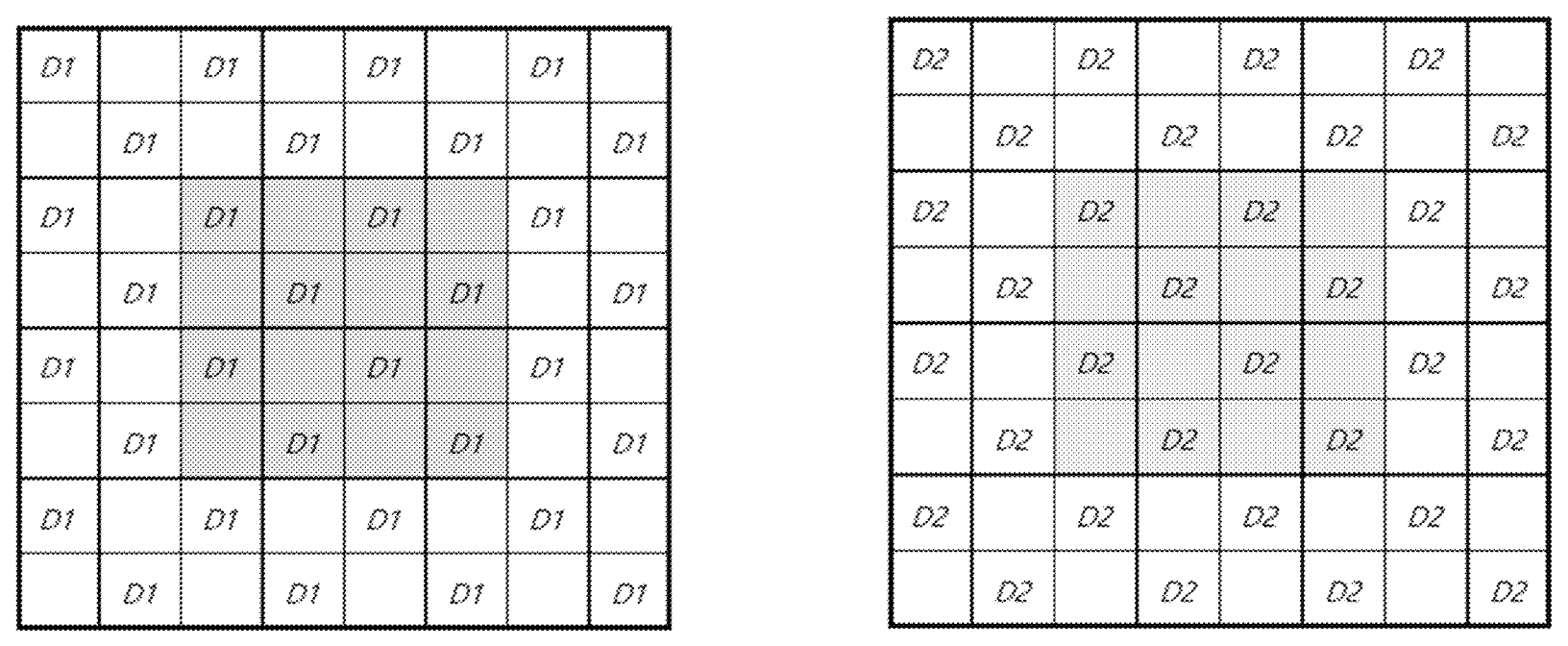

FIGS. 4A-4D show example subsampled Laplacian calculations for adaptive loop filter (ALF) classification.

DETAILED DESCRIPTION

Figure 1:
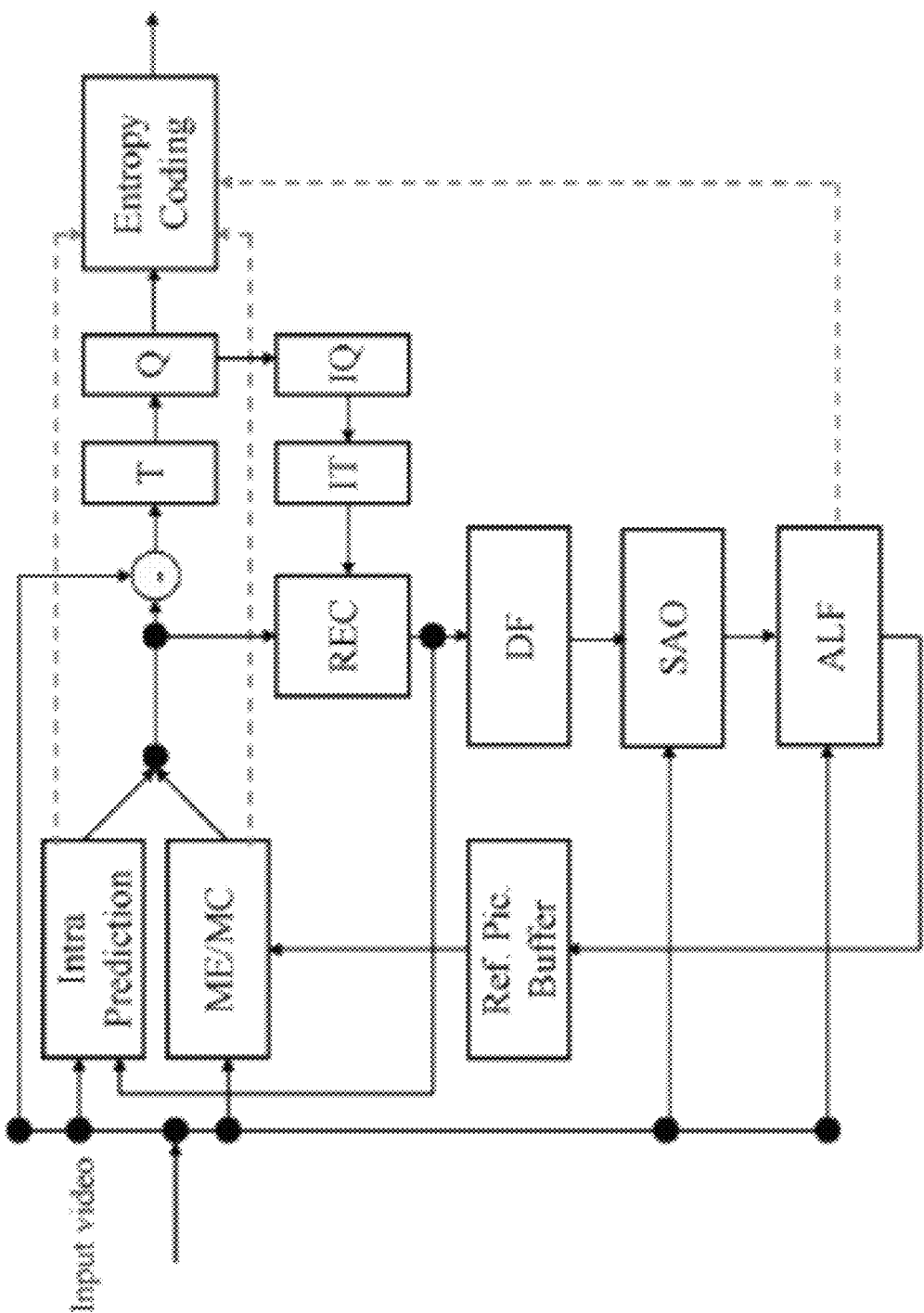
FIG. 1 shows an example of an encoder block diagram for video coding.

Due to the increasing demand of higher resolution video, video coding methods and techniques are ubiquitous in modern technology. Video codecs typically include an electronic circuit or software that compresses or decompresses digital video, and are continually being improved to provide higher coding efficiency. A video codec converts uncompressed video to a compressed format or vice versa. There are complex relationships between the video quality, the amount of data used to represent the video (determined by the bit rate), the complexity of the encoding and decoding algorithms, sensitivity to data losses and errors, ease of editing, random access, and end-to-end delay (latency). The compressed format usually conforms to a standard video compression specification, e.g., the High Efficiency Video Coding (HEVC) standard (also known as H.265 or MPEG-H Part 2), the Versatile Video Coding (VVC) standard to be finalized, or other current and/or future video coding standards.

Video coding standards have evolved primarily through the development of the well-known ITU-T and ISO/IEC standards. The ITU-T produced H.261 and H.263, ISO/IEC produced MPEG-1 and MPEG-4 Visual, and the two organizations jointly produced the H.262/MPEG-2 Video and H.264/MPEG-4 Advanced Video Coding (AVC) and H.265/HEVC standards. Since H.262, the video coding standards are based on the hybrid video coding structure wherein temporal prediction plus transform coding are utilized. To explore the future video coding technologies beyond HEVC, Joint Video Exploration Team (JVET) was founded by VCEG and MPEG jointly in 2015. Since then, many new methods have been adopted by JVET and put into the reference software named Joint Exploration Model (JEM). In April 2018, the Joint Video Expert Team (JVET) between VCEG (Q6/16) and ISO/IEC JTC1 SC29/WG11 (MPEG) was created to work on the VVC standard targeting at 50% bitrate reduction compared to HEVC.

Embodiments of the disclosed technology may be applied to existing video coding standards (e.g., HEVC, H.265) and future standards to improve runtime performance. Section headings are used in the present document to improve readability of the description and do not in any way limit the discussion or the embodiments (and/or implementations) to the respective sections only.

1 Examples of Color Space and Chroma Subsampling

Color space, also known as the color model (or color system), is an abstract mathematical model which simply describes the range of colors as tuples of numbers, typically as 3 or 4 values or color components (e.g. RGB). Basically speaking, color space is an elaboration of the coordinate system and sub-space.

For video compression, the most frequently used color spaces are YCbCr and RGB.

YCbCr, Y'CbCr, or Y Pb/Cb Pr/Cr, also written as YCBCR or Y'CBCR, is a family of color spaces used as a part of the color image pipeline in video and digital photography systems. Y' is the luma component and CB and CR are the blue-difference and red-difference chroma components. Y' (with prime) is distinguished from Y, which is luminance, meaning that light intensity is nonlinearly encoded based on gamma corrected RGB primaries.

Chroma subsampling is the practice of encoding images by implementing less resolution for chroma information than for luma information, taking advantage of the human visual system's lower acuity for color differences than for luminance.

1.1 The 4:4:4 Color Format

Each of the three Y'CbCr components have the same sample rate, thus there is no chroma subsampling. This scheme is sometimes used in high-end film scanners and cinematic post production.

1.2 The 4:2:2 Color Format

The two chroma components are sampled at half the sample rate of luma, e.g. the horizontal chroma resolution is halved. This reduces the bandwidth of an uncompressed video signal by one-third with little to no visual difference.

1.3 The 4:2:0 Color Format

In 4:2:0, the horizontal sampling is doubled compared to 4:1:1, but as the Cb and Cr channels are only sampled on each alternate line in this scheme, the vertical resolution is halved. The data rate is thus the same. Cb and Cr are each subsampled at a factor of 2 both horizontally and vertically. There are three variants of 4:2:0 schemes, having different horizontal and vertical siting.

In MPEG-2, Cb and Cr are cosited horizontally. Cb and Cr are sited between pixels in the vertical direction (sited interstitially).

In JPEG/JFIF, H.261, and MPEG-1, Cb and Cr are sited interstitially, halfway between alternate luma samples.

In 4:2:0 DV, Cb and Cr are co-sited in the horizontal direction. In the vertical direction, they are co-sited on alternating lines.

2 Examples of the Coding Flow of a Typical Video Codec

FIG. 1 shows an example of encoder block diagram of VVC, which contains three in-loop filtering blocks: deblocking filter (DF), sample adaptive offset (SAO) and ALF. Unlike DF, which uses predefined filters, SAO and ALF utilize the original samples of the current picture to reduce the mean square errors between the original samples and the reconstructed samples by adding an offset and by applying a finite impulse response (FIR) filter, respectively, with coded side information signaling the offsets and filter coefficients. ALF is located at the last processing stage of each picture and can be regarded as a tool trying to catch and fix artifacts created by the previous stages.

3 Examples of a Geometry Transformation-Based Adaptive Loop Filter in JEM

In the JEM, an geometry transformation-based adaptive loop filter (GALF) with block-based filter adaption is applied. For the luma component, one among 25 filters is selected for each 2×2 block, based on the direction and activity of local gradients.

3.1 Examples of Filter Shape

Figures 2A, 2B, 2C:
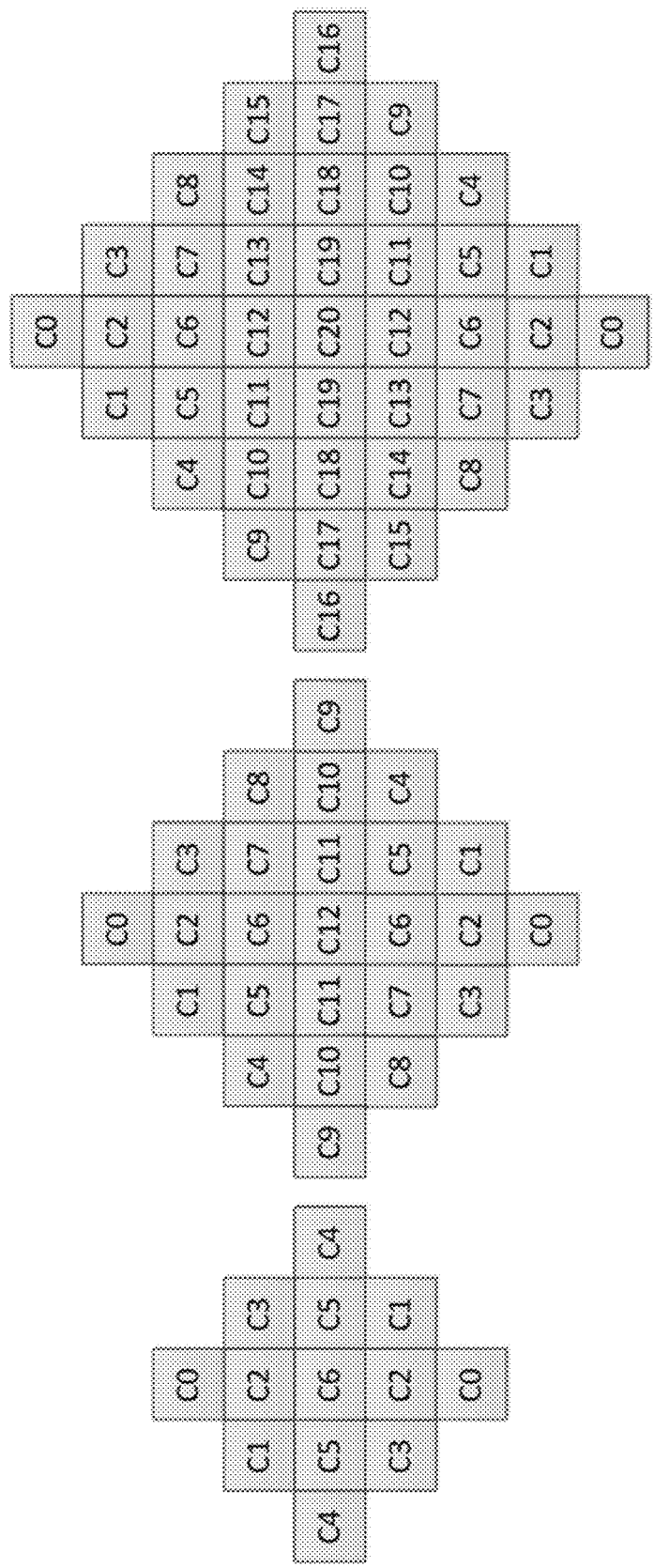
FIGS. 2A, 2B and 2C show examples of geometry transformation-based adaptive loop filter (GALF) filter shapes.

In the JEM, up to three diamond filter shapes (as shown in FIGS. 2A, 2B and 2C for the 5×5 diamond, 7×7 diamond and 9×9 diamond, respectively) can be selected for the luma component. An index is signalled at the picture level to indicate the filter shape used for the luma component. For chroma components in a picture, the 5×5 diamond shape is always used.

3.1.1 Block Classification Each 2×2 block is categorized into one out of 25 classes. The classification index C is derived based on its directionality D and a quantized value of activity $\hat{A}$, as follows:

$$C=5D+\hat{A}. \quad (1)$$

To calculate D and $\hat{A}$, gradients of the horizontal, vertical and two diagonal direction are first calculated using 1-D Laplacian:

$$g_v = \sum_{k=i-2}^{i+3} \sum_{l=j-2}^{j+3} V_{k,l}, \quad (2)$$

$$V_{k,l} = |2R(k, l) - R(k, l-1) - R(k, l+1)|,$$

$$g_h = \sum_{k=i-2}^{i+3} \sum_{l=j-2}^{j+3} H_{k,l}, \quad (3)$$

$$H_{k,l} = |2R(k, l) - R(k-1, l) - R(k+1, l)|,$$

$$g_{d1} = \sum_{k=i-2}^{i+3} \sum_{l=j-3}^{j+3} D1_{k,l}, \quad (4)$$

$$D1_{k,l} = |2R(k, l) - R(k-1, l-1) - R(k+1, l+1)|$$

$$g_{d2} = \sum_{k=i-2}^{i+3} \sum_{l=j-2}^{j+3} D2_{k,l}, \quad (5)$$

$$D2_{k,l} = |2R(k, l) - R(k-1, l+1) - R(k+1, l-1)|$$

Indices i and j refer to the coordinates of the upper left sample in the 2×2 block and R(i,j) indicates a reconstructed sample at coordinate (i,j).

Then D maximum and minimum values of the gradients of horizontal and vertical directions are set as:

$$g_{h,v}^{max} = \max(g_h, g_v), g_{h,v}^{min} = \min(g_h, g_v), \quad (6)$$

and the maximum and minimum values of the gradient of two diagonal directions are set as:

$$g_{d0,d1}^{max} = \max(g_{d0}, g_{d1}), g_{d0,d1}^{min} = \min(g_{d0}, g_{d1}), \quad (7)$$

To derive the value of the directionality D, these values are compared against each other and with two thresholds $t_1$ and $t_2$:

Step 1. If both $g_{h,v}^{max} \leq t_1 \cdot g_{h,v}^{min}$ and $g_{d0,d1}^{max} \leq t_1 \cdot g_{d0,d1}^{min}$ are true, D is set to 0.

Step 2. If $g_{h,v}^{max}/g_{h,v}^{min} > g_{d0,d1}^{max}/g_{d0,d1}^{min}$, continue from Step 3; otherwise continue from Step 4.

Step 3. If $g_{h,v}^{max} > t_2 \cdot g_{h,v}^{min}$, is set to 2; otherwise D is set to 1.

Step 4. If $g_{d0,d1}^{max} > t_2 \cdot g_{d0,d1}^{min}$, is set to 4; otherwise D is set to 3.

The activity value A is calculated as:

$$A = \sum_{k=i-2}^{i+3} \sum_{l=j-2}^{j+3} (V_{k,l} + H_{k,l}). \quad (8)$$

A is further quantized to the range of 0 to 4, inclusively, and the quantized value is denoted as Â. For both chroma components in a picture, no classification method is applied, i.e. a single set of ALF coefficients is applied for each chroma component.

3.1.2 Geometric Transformations of Filter Coefficients

Before filtering each 2×2 block, geometric transformations such as rotation or diagonal and vertical flipping are applied to the filter coefficients f(k, l) depending on gradient values calculated for that block. This is equivalent to applying these transformations to the samples in the filter support region. The idea is to make different blocks to which ALF is applied more similar by aligning their directionality.

Three geometric transformations, including diagonal, vertical flip and rotation are introduced:

Diagonal: $f_D(k,l) = f(l,k)$,

Vertical flip: $f_V(k,l) = f(k, K-l-1)$,

Rotation: $f_R(k,l) = f(K-l-1, k)$. (9)

Herein, K is the size of the filter and $0 \leq k, l \leq K-1$ are coefficients coordinates, such that location (0,0) is at the upper left corner and location (K−1, K−1) is at the lower right corner. The transformations are applied to the filter coefficients f(k, l) depending on gradient values calculated for that block. The relationship between the transformation and the four gradients of the four directions are summarized in Table 1.

TABLE 1

Mapping of the gradient calculated for one block and the transformations

| Gradient values | Transformation |
|---|---|
| $g_{d2} < g_{d1}$ and $g_h < g_v$ | No transformation |
| $g_{d2} < g_{d1}$ and $g_v < g_h$ | Diagonal |
| $g_{d1} < g_{d2}$ and $g_h < g_v$ | Vertical flip |
| $g_{d1} < g_{d2}$ and $g_v < g_h$ | Rotation |

3.1.3 Signaling of Filter Parameters

In the JEM, GALF filter parameters are signaled for the first CTU, i.e., after the slice header and before the SAO parameters of the first CTU. Up to 25 sets of luma filter coefficients could be signaled. To reduce bits overhead, filter coefficients of different classification can be merged. Also, the GALF coefficients of reference pictures are stored and allowed to be reused as GALF coefficients of a current picture. The current picture may choose to use GALF coefficients stored for the reference pictures, and bypass the GALF coefficients signaling. In this case, only an index to one of the reference pictures is signaled, and the stored GALF coefficients of the indicated reference picture are inherited for the current picture.

To support GALF temporal prediction, a candidate list of GALF filter sets is maintained. At the beginning of decoding a new sequence, the candidate list is empty. After decoding one picture, the corresponding set of filters may be added to the candidate list. Once the size of the candidate list reaches the maximum allowed value (i.e., 6 in current JEM), a new set of filters overwrites the oldest set in decoding order, and that is, first-in-first-out (FIFO) rule is applied to update the candidate list. To avoid duplications, a set could only be added to the list when the corresponding picture doesn't use GALF temporal prediction. To support temporal scalability, there are multiple candidate lists of filter sets, and each candidate list is associated with a temporal layer. More specifically, each array assigned by temporal layer index (TempIdx) may compose filter sets of previously decoded pictures with equal to lower TempIdx. For example, the k-th array is assigned to be associated with TempIdx equal to k, and it only contains filter sets from pictures with TempIdx smaller than or equal to k. After coding a certain picture, the filter sets associated with the picture will be used to update those arrays associated with equal or higher TempIdx.

Temporal prediction of GALF coefficients is used for inter coded frames to minimize signaling overhead. For intra frames, temporal prediction is not available, and a set of 16 fixed filters is assigned to each class. To indicate the usage of the fixed filter, a flag for each class is signaled and if required, the index of the chosen fixed filter. Even when the fixed filter is selected for a given class, the coefficients of the adaptive filter f(k,l) can still be sent for this class in which case the coefficients of the filter which will be applied to the reconstructed image are sum of both sets of coefficients.

The filtering process of luma component can controlled at CU level. A flag is signaled to indicate whether GALF is applied to the luma component of a CU. For chroma component, whether GALF is applied or not is indicated at picture level only.

3.1.4 Filtering Process

At decoder side, when GALF is enabled for a block, each sample R(i, j) within the block is filtered, resulting in sample value R'(i, j) as shown below, where L denotes filter length, $f_{m,n}$ represents filter coefficient, and f(k, l) denotes the decoded filter coefficients.

$$R'(i,j) = \Sigma_{k=-L/2}^{L/2} \Sigma_{l=-L/2}^{L/2} f(k,l) \times R(i+k, j+l) \quad (10)$$

3.1.5 Determination Process for Encoder Side Filter Parameters

Figure 3:
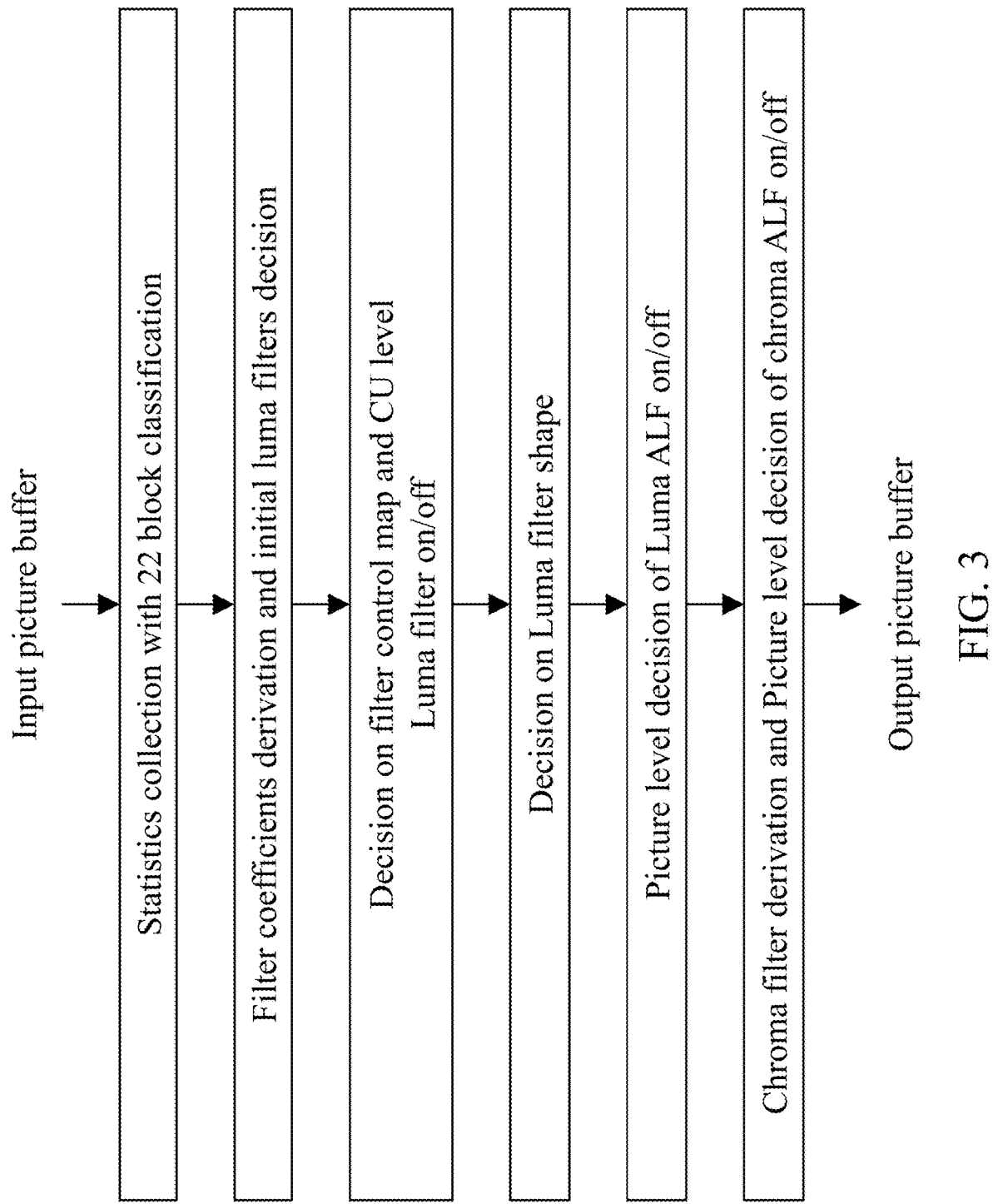
FIG. 3 shows an example of a flow graph for a GALF encoder decision.

Overall Encoder Decision Process for GALF is Illustrated in FIG. 3. For Luma Samples of each CU, the encoder makes a decision on whether or not the GALF is applied and the appropriate signalling flag is included in the slice header. For chroma samples, the decision to apply the filter is done based on the picture-level rather than CU-level. Furthermore, chroma GALF for a picture is checked only when luma GALF is enabled for the picture.

4 Examples of a Geometry Transformation-Based Adaptive Loop Filter in VVC

The current design of GALF in VVC has the following major changes compared to that in JEM:

1) The adaptive filter shape is removed. Only 7×7 filter shape is allowed for luma component and 5×5 filter shape is allowed for chroma component.
2) Temporal prediction of ALF parameters and prediction from fixed filters are both removed.
3) For each CTU, one bit flag is signaled whether ALF is enabled or disabled.
4) Calculation of class index is performed in 4×4 level instead of 2×2. In addition, as proposed in JVET-L0147, sub-sampled Laplacian calculation method for ALF classification is utilized, as shown in FIGS. 4A-4D. More specifically, there is no need to calculate the horizontal/vertical/45 diagonal/135 degree gradients for each sample within one block. Instead, 1:2 subsampling is utilized.

In VTM4.0, the filtering process of the Adaptive Loop Filter, is performed as follows:

$$O(x,y) = \Sigma_{(i,j)} w(i,j) \cdot I(x+i, y+j) \quad (11)$$

where samples I(x+i, y+j) are input samples, O(x, y) is the filtered output sample (i.e. filter result), and w(i,j) denotes the filter coefficients. In practice, in VTM4.0 it is implemented using integer arithmetic for fixed point precision computations:

$$O(x, y) = \left( \Sigma_{i=-\frac{L}{2}}^{\frac{L}{2}} \Sigma_{j=-\frac{L}{2}}^{\frac{L}{2}} w(i, j) \cdot I(x+i, y+j) + 64 \right) \gg 7 \quad (12)$$

where L denotes the filter length, and where w(i,j) are the filter coefficients in fixed point precision.

5 Non-Linear Adaptive Loop Filtering (ALF) in JVET-N0242

5.1 Filtering Reformulation

Equation (11) can be reformulated, without coding efficiency impact, in the following expression:

$$O(x,y) = I(x,y) + \Sigma_{(i,j) \neq (0,0)} w(i,j) \cdot (I(x+i, y+j) - I(x,y)) \quad (13)$$

Herein, w(i,j) are the same filter coefficients as in equation (11) [excepted w(0,0) which is equal to 1 in equation (13) while it is equal to $1 - \Sigma_{(i,j) \neq (0,0)} w(i,j)$ in equation (11)].

5.2 Modified Filter

Using this above filter formula of (13), we can easily introduce non linearity to make ALF more efficient by using a simple clipping function to reduce the impact of neighbor sample values (I(x+i, y+j)) when they are too different with the current sample value (I(x, y)) being filtered.

In this proposal, the ALF filter is modified as follows:

$$O'(x,y) = I(x,y) + \Sigma_{(i,j) \neq (0,0)} w(i,j) \times K(I(x+i,y+j) - I(x,y), k(i,j)) \quad (14)$$

Herein, K(d, b)=min(b, max(−b, d)) is the clipping function, and k(i, j) are clipping parameters, which depends on the(i, j) filter coefficient. The encoder performs the optimization to find the best k(i, j). Note that for implementation in integer precision, shifting with rounding $\Sigma_{(i,j) \neq (0,0)} w(i,j) \times K(I(x+i, y+j) - I(x, y), k(i, j))$ is applied.

In the JVET-N0242 implementation, the clipping parameters k(i,j) are specified for each ALF filter, one clipping value is signaled per filter coefficient. It means that up to 12 clipping values can be signalled in the bitstream per Luma filter and up to 6 clipping values for the Chroma filter.

In order to limit the signaling cost and the encoder complexity, we limit the evaluation of the clipping values to a small set of possible values. In the proposal, we only use 4 fixed values which are the same for INTER and INTRA tile groups.

Because the variance of the local differences is often higher for Luma than for Chroma, we use two different sets for the Luma and Chroma filters. We also include the maximum sample value (here 1024 for 10 bits bit-depth) in each set, so that clipping can be disabled if it is not necessary.

The sets of clipping values used in the JVET-N0242 tests are provided in the Table 2. The 4 values have been selected by roughly equally splitting, in the logarithmic domain, the full range of the sample values (coded on 10 bits) for Luma, and the range from 4 to 1024 for Chroma.

More precisely, the Luma table of clipping values have been obtained by the following formula:

$$AlfClip_L = \left\{ \text{round} \left( \left( (M)^{\frac{1}{N}} \right)^{N-n+1} \right) \text{ for } n \in 1..N \right\},$$

with $M = 2^{10}$ and $N = 4$.

Similarly, the Chroma tables of clipping values is obtained according to the following formula:

$$AlfClip_C = \left\{ \text{round} \left( A \cdot \left( \left( \frac{M}{A} \right)^{\frac{1}{N-1}} \right)^{N-n} \right) \text{ for } n \in 1..N \right\},$$

with $M = 2^{10}$, $N = 4$ and $A = 4$.

TABLE 2

| Authorized clipping values | |
|---|---|
| | INTRA/INTER tile group |
| LUMA | { 1024, 181, 32, 6 } |
| CHROMA | { 1024, 161, 25, 4 } |

The selected clipping values are coded in the "alf_data" syntax element by using a Golomb encoding scheme corresponding to the index of the clipping value in the above Table 2. This encoding scheme is the same as the encoding scheme for the filter index.

5.2.1 Syntax, Semantics

The newly introduced syntax changes (shown below in bolded, italicized, and underlined font) due to the NLALF is

7.3.4.3 Adaptive Loop Filter Data Syntax

|  | Descriptor |
|---|---|
| alf_data( ) { |  |
|   *alf_chroma_idc* | tu(v) |
|   *alf_luma_clip* | *u(1)* |
|   *if( alf_choma_idc )* |  |
|     *alf_chroma_clip* | *u(1)* |
|   alf_luma_num_filters_signalled_minus1 | tb(v) |
|   if( alf_luma_num_filters_signalled_minus1 > 0 ) { |  |
|     for( filtIdx = 0; filtIdx < NumAlfFilters; filtIdx++) |  |
|       alf_luma_coeff_delta_idx[ filtIdx ] | tb(v) |
|   } |  |
|   alf_luma_coeff_delta_flag | u(1) |
|   if ( !alf_luma_coeff_delta_flag && alf_luma_num_filters_signalled_minus1 > 0 ) |  |
|     alf_luma_coeff_delta_prediction_flag | u(1) |
|   alf_luma_min_eg_order_minus1 | ue(v) |
|   for( i = 0; i < 3; i++) |  |
|     alf_luma_eg_order_increase_flag[ i ] | u(1) |
|   if ( alf_luma_coeff_delta_flag ) { |  |
|     for( sigFiltIdx = 0; sigFiltIdx <= alf_luma_num_filters_signalled_minus1; sigFiltIdx++) |  |
|       alf_luma_coeff_flag[ sigFiltIdx ] | u(1) |
|   } |  |
|   for( sigFiltIdx = 0; sigFiltIdx <= alf_luma_num_filters_signalled_minus1; sigFiltIdx++) { |  |
|     if ( alf_luma_coeff_flag[sigFiltIdx] ) { |  |
|       for ( j = 0; j < 12; j++) { |  |
|         alf_luma_coeff_delta_abs[sigFiltIdx ][ j ] | uek(v) |
|         if( alf_luma_coeff_delta_abs[sigFiltIdx ][ j ]) |  |
|           alf_luma_coeff_delta_sign[sigFiltIdx ][ j ] | u(1) |
|       } |  |
|     } |  |
|   } |  |
|   *if( alf_luma_clip ) {* |  |
|     *alf_luma_clip_min_eg_order_minus1* | *ue(v)* |
|     *for( i = 0; i < 3; i++ )* |  |
|       *alf_luma_clip_eg_order_increase_flag[ i ]* | *u(1)* |
|     *for ( sigFiltIdx = 0; sigFiltIdx <= alf_luma_num_filters_signalled_minus1; sigFiltIdx++ )* { |  |
|       *if ( alf_luma_coeff_flag[ sigFiltIdx ] ) {* |  |
|         *for ( j = 0; j < 12; j++ ) {* |  |
|           *if( filterCoefficients[ sigFiltIdx ][ j ] )* |  |
|             *alf_luma_clip_idx[ sigFiltIdx ][ j ]* | *uek(v)* |
|         *}* |  |
|       *}* |  |
|     *}* |  |
|   if ( alf_chroma_idc > 0 ) { |  |
|     alf_chroma_min_eg_order_minus1 | ue(v) |
|     for( i = 0; i < 2; i++) |  |
|       alf_chroma_eg_order_increase_flag[ i ] | u(1) |
|     for( j = 0; j < 6; j++) { |  |
|       alf_chroma_coeff_abs[ j ] | uek(v) |
|       if( alf_chroma_coeff_abs[ j ] > 0) |  |
|         alf_chroma_coeff_sign[ j ] | u(1) |
|     } |  |
|   } |  |
|   *if ( alf_chroma_idc > 0 && alf_chroma_clip ) {* |  |
|     *alf_chroma_clip_min_eg_order_minus1* | *ue(v)* |
|     *for( i = 0; i < 2; i++ )* |  |
|       *alf_chroma_clip_eg_order_increase_flag[ i ]* | *u(1)* |
|     *for( j = 0; j < 6; j++ ) {* |  |
|       *if( alf_chroma_coeff_abs[ j ] )* |  |
|         *alf_chroma_clip_idx[ j ]* | *uek(v)* |
|     *}* |  |
|   *}* |  |
| } |  |

6 CTU-Based ALF in JVET-N0427

Adaptive parameter set (APS) was adopted in VTM4. Each APS contains one set of signalled ALF filters, up to 32 APSs are supported. In the proposal, slice-level temporal filter is tested. A tile group can re-use the ALF information from an APS to reduce the overhead. The APSs are updated as a first-in-first-out (FIFO) buffer.

For luma component, when ALF is applied to a luma CTB, the choice among 16 fixed, 5 temporal or 1 signaled filter sets (signalled in slice level) is indicated. Only the filter set index is signalled. For one slice, only one new set of 25 filters can be signaled. If a new set is signalled for a slice, all the luma CTBs in the same slice share that set. Fixed filter sets can be used to predict the new slice-level filter set and can be used as candidate filter sets for a luma CTB as well. The number of filters is 64 in total.

For chroma component, when ALF is applied to a chroma CTB, if a new filter is signalled for a slice, the CTB used the new filter, otherwise, the most recent temporal chroma filter satisfying the temporal scalability constrain is applied.

As the slice-level temporal filter, the APSs are updated as a first-in-first-out (FIFO) buffer.

7 Post-Reconstruction Filters

7.1 Diffusion Filter (DF)

In JVET-L0157, diffusion filter is proposed, wherein the intra/inter prediction signal of the CU may be further modified by diffusion filters.

Uniform diffusion filter. The Uniform Diffusion Filter is realized by convolving the prediction signal with a fixed mask that is either given as $h^I$ or as $h^{IV}$, defined below. Besides the prediction signal itself, one line of reconstructed samples left and above of the block are used as an input for the filtered signal, where the use of these reconstructed samples can be avoided on inter blocks.

Let pred be the prediction signal on a given block obtained by intra or motion compensated prediction. In order to handle boundary points for the filters, the prediction signal needs to be extended to a prediction signal $pred_{ext}$. This extended prediction can be formed in two ways:

Either, as an intermediate step, one line of reconstructed samples left and above the block are added to the prediction signal and then the resulting signal is mirrored in all directions. Or only the prediction signal itself is mirrored in all directions. The latter extension is used for inter blocks. In this case, only the prediction signal itself comprises the input for the extended prediction signal $pred_{ext}$.

If the filter $h^I$ is to be used, it is proposed to replace the prediction signal pred by $$h^I * \text{pred},$$

using the aforementioned boundary extension. Here, the filter mask $h^I$ is given as $$h^I = (0.25)^4 \begin{pmatrix} 0 & 0 & 0 & 0 & 1 & 0 & 0 & 0 & 0 \\ 0 & 0 & 0 & 4 & 0 & 4 & 0 & 0 & 0 \\ 0 & 0 & 6 & 0 & 16 & 0 & 6 & 0 & 0 \\ 0 & 4 & 0 & 24 & 0 & 24 & 0 & 4 & 0 \\ 1 & 0 & 16 & 0 & 36 & 0 & 16 & 0 & 1 \\ 0 & 4 & 0 & 24 & 0 & 24 & 0 & 4 & 0 \\ 0 & 0 & 6 & 0 & 16 & 0 & 6 & 0 & 0 \\ 0 & 0 & 0 & 4 & 0 & 4 & 0 & 0 & 0 \\ 0 & 0 & 0 & 0 & 1 & 0 & 0 & 0 & 0 \end{pmatrix}.$$

If the filter $h^{IV}$ is to be used, it is proposed to replace the prediction signal pred by $$h^{IV} * \text{pred}$$

Here, the filter $h^{iv}$ is given as $$h^{IV} = h^I * h^I * h^I * h^I.$$

Directional diffusion filter. Instead of using signal adaptive diffusion filters, directional filters, a horizontal filter $h^{hor}$ and a vertical filter $h^{ver}$, are used which still have a fixed mask. More precisely, the uniform diffusion filtering corresponding to the mask $h^I$ of the previous section is simply restricted to be either applied only along the vertical or along the horizontal direction. The vertical filter is realized by applying the fixed filter mask $$h_{ver} = (0.5)^4 \begin{pmatrix} 1 \\ 0 \\ 4 \\ 0 \\ 6 \\ 0 \\ 4 \\ 0 \\ 1 \end{pmatrix}$$

to the prediction signal and the horizontal filter is realized by using the transposed mask $h_{hor} = h_{ver}^t$.

7.2 Bilateral Filter (BF)

Bilateral filter is proposed in JVET-L0406, and it is always applied to luma blocks with non-zero transform coefficients and slice quantization parameter larger than 17. Therefore, there is no need to signal the usage of the bilateral filter. Bilateral filter, if applied, is performed on decoded samples right after the inverse transform. In addition, the filter parameters, i.e., weights are explicitly derived from the coded information.

The filtering process is defined as:

$$P'_{0,0} = P_{0,0} + \Sigma_{k=1}^{K} W_k(\text{abs}(P_{k,0} - P_{0,0})) \times (P_{k,0} - P_{0,0}). \tag{1}$$

Figure 5:
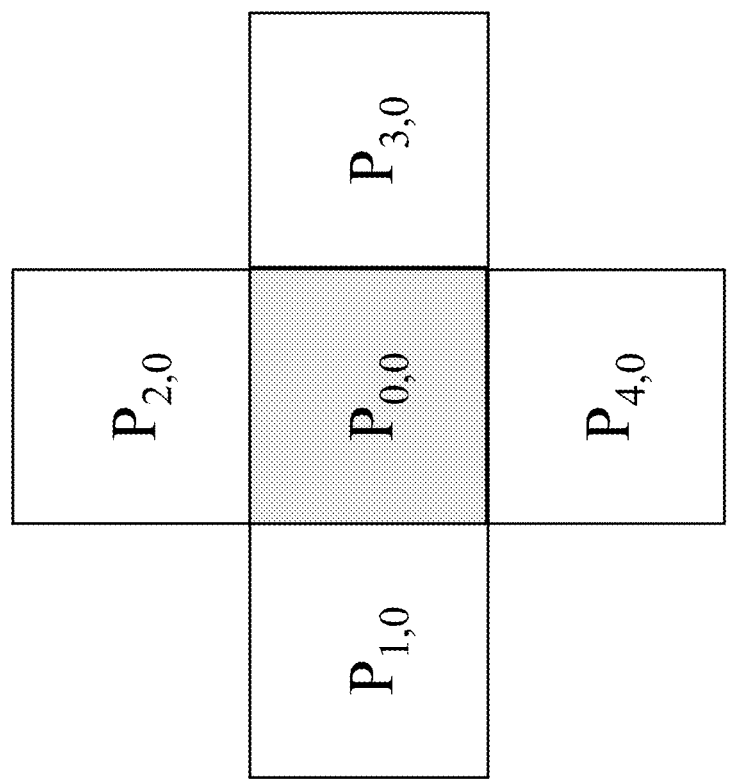
FIG. 5 shows an example of neighboring samples utilized in a bilateral filter.

Herein, $P_{0,0}$ is the intensity of the current sample and $P'_{0,0}$ is the modified intensity of the current sample, $P_{k,0}$ and $W_k$ are the intensity and weighting parameter for the k-th neighboring sample, respectively. An example of one current sample and its four neighboring samples (i.e., K=4) is depicted in FIG. 5.

More specifically, the weight $W_k(x)$ associated with the k-th neighboring sample is defined as follows:

$$W_k(x) = \text{Distance}_k \times \text{Range}_k(x). \tag{2}$$

Herein, $\text{Distance}_k = e^{\left(-\frac{10000}{2\sigma_d^2}\right)} \Big/ 1 + 4 * e^{\left(-\frac{10000}{2\sigma_d^2}\right)}$ and $$\text{Range}_k(x) = e^{\left(-\frac{x^2}{8*(QP-17)*(QP-17)}\right)}.$$

Herein, $\sigma_d$ is dependent on the coded mode and coding block sizes. The described filtering process is applied to intra-coded blocks, and inter-coded blocks when TU is further split, to enable parallel processing.

To better capture statistical properties of video signal, and improve performance of the filter, weights function resulted from Equation (2) are being adjusted by the $\sigma_d$ parameter, tabulated in Table 4 as being dependent on coding mode and parameters of block partitioning (minimal size).

TABLE 4

Value of $\sigma_j$ for different block sizes and coding modes

| Min(block width, block height) | Intra mode | Inter mode |
| --- | --- | --- |
| 4 | 82 | 62 |
| 8 | 72 | 52 |
| Other | 52 | 32 |

To further improve the coding performance, for inter-coded blocks when TU is not split, the intensity difference between current sample and one of its neighboring samples is replaced by a representative intensity difference between two windows covering current sample and the neighboring sample. Therefore, the equation of filtering process is revised to:

$$P'_{0,0} = P_{0,0} + \sum_{k=1}^{N} W_k \left( \frac{1}{M} \sum_{m=-M/2}^{M/2} \text{abs}(P_{k,m} - P_{0,m}) \right) \times (P_{k,0} - P_{0,0}) \quad (4)$$

Figure 6:
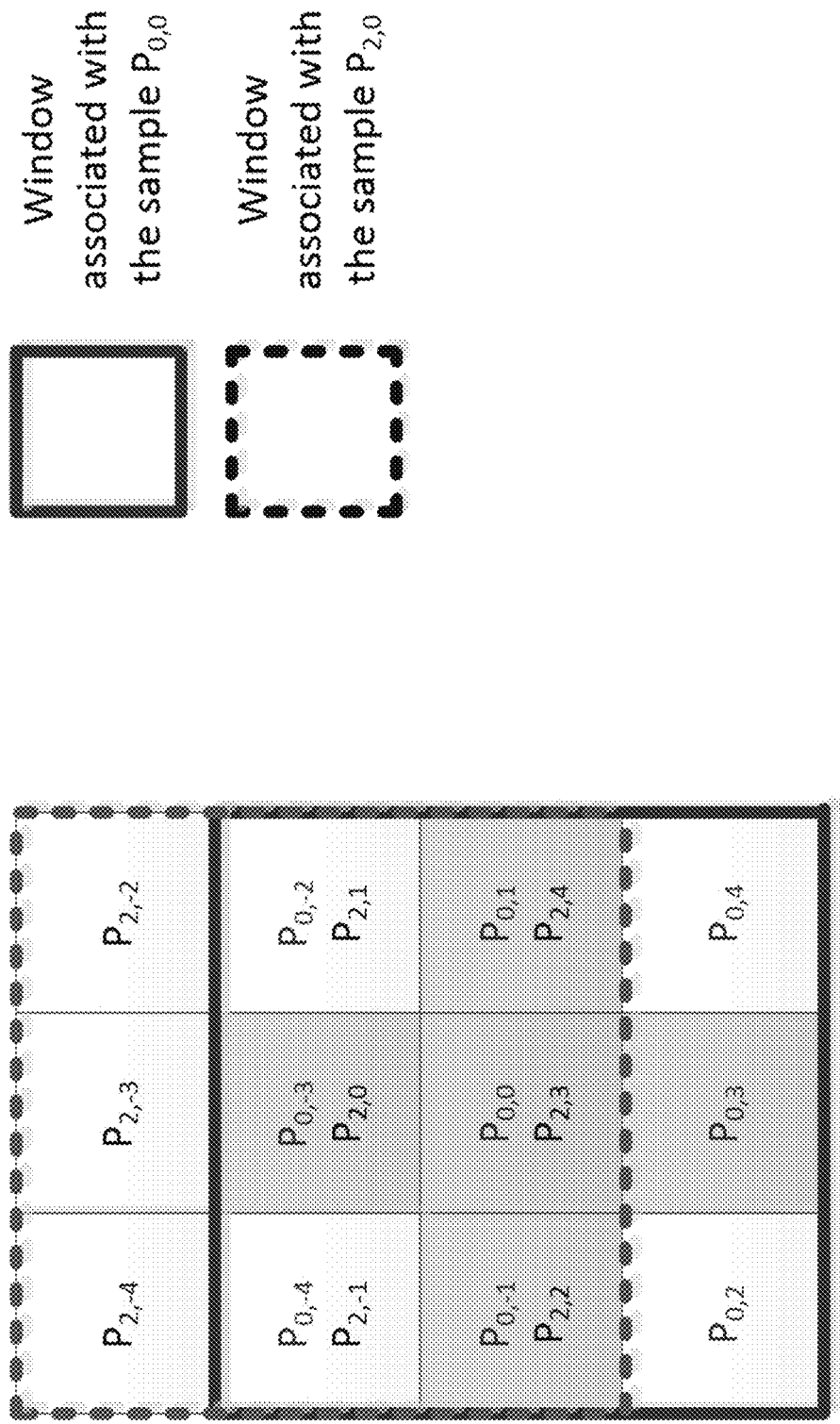
FIG. 6 shows an example of windows covering two samples utilized in a weight calculation.

Herein, $P_{k,m}$ and $P_{0,m}$ represent the m-th sample value within the windows centered at $P_{k,0}$ and $P_{0,0}$, respectively. In this proposal, the window size is set to 3×3. An example of two windows covering $P_{2,0}$ and $P_{0,0}$ are depicted in FIG. 6.

7.3 Hadamard Transform Domain Filter (HF)

In JVET-K0068, in-loop filter in 1D Hadamard transform domain which is applied on CU level after reconstruction and has multiplication free implementation. Proposed filter is applied for all CU blocks that meet the predefined condition and filter parameters are derived from the coded information.

Proposed filtering is always applied to luma reconstructed blocks with non-zero transform coefficients, excluding 4×4 blocks and if slice quantization parameter is larger than 17. The filter parameters are explicitly derived from the coded information. Proposed filter, if applied, is performed on decoded samples right after inverse transform.

For each pixel from reconstructed block pixel processing comprises the following steps:
Scan 4 neighboring pixels around processing pixel including current one according to scan pattern
4 point Hadamard transform of read pixels
Spectrum filtering based on the following formula:

$$F(i, \sigma) = \frac{R(i)^2}{R(i)^2 + \sigma^2} * R(i)$$

Herein, (i) is index of spectrum component in Hadamard spectrum, R(i) is spectrum component of reconstructed pixels corresponding to index, a is filtering parameter deriving from codec quantization parameter QP using following equation:

$$\sigma = 2^{(1+0.126*(QP-27))}.$$

Figure 7:
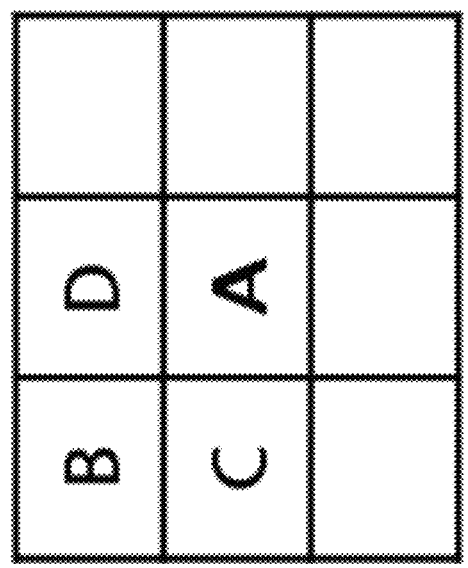
FIG. 7 shows an example of a scan pattern.

The example of scan pattern is shown in FIG. 7, wherein A is the current pixel and {B,C,D} are surrounding pixels.

For pixels laying on CU boundary, the scan pattern is adjusted ensuring all required pixels are within current CU.

8 Virtual Pipelining Data Units (VPDU)

Virtual pipeline data units (VPDUs) are defined as non-overlapping M×M-luma(L)/N×N-chroma(C) units in a picture. In hardware decoders, successive VPDUs are processed by multiple pipeline stages at the same time; different stages process different VPDUs simultaneously. The VPDU size is roughly proportional to the buffer size in most pipeline stages, so it is said to be very important to keep the VPDU size small. In HEVC hardware decoders, the VPDU size is set to the maximum transform block (TB) size. Enlarging the maximum TB size from 32×32-L/16×16-C (as in HEVC) to 64×64-L/32×32-C (as in the current VVC) can bring coding gains, which results in 4× of VPDU size (64×64-L/32×32-C) expectedly in comparison with HEVC. However, in addition to quadtree (QT) coding unit (CU) partitioning, ternary tree (TT) and binary tree (BT) are adopted in VVC for achieving additional coding gains, and TT and BT splits can be applied to 128×128-L/64×64-C coding tree blocks (CTUs) recursively, which is said to lead to 16× of VPDU size (128×128-L/64×64-C) in comparison with HEVC.

In current design of VVC, the VPDU size is defined as 64×64-L/32×32-C.

9 Drawbacks of Existing Implementations

The non-linear ALF (NLALF) design in JVET-N0242 has the following problems:
  (1) The classification process in GALF relies on the gradient and Laplacian activities which utilize the reconstructed samples before applying ALF. However, the classification results may be inaccurate. For example, for one sample, differences between it and its neighbors may be quite similar while for another sample, difference between it and one neighbor may be too different and for all others, difference may be too small. For these two cases, they may be classified to one class index which may be unreasonable.
  (2) The clipping parameters are associated with the filter coefficient. However, one filter may be utilized for multiple classes due to filter merging process. In addition, for two blocks with the same class index (0 . . . 24 in current GALF design), the filter coefficients and clipping parameters are the same. However, the two blocks may have different characteristics, for example, the selected geometric transformation may be different. Using same clipping parameters may be suboptimal.
  (3) The index of clipping parameters is signaled per non-zero filter coefficient which requires to construct the filter coefficients in the parsing stage. Such a design is undesirable for hardware implementation.
  (4) In the temporal prediction process, one block may inherit the filter coefficients from previously coded frames. How to handle the clipping parameters need to be studied.
  (5) The clipping function K(d, b)=min(b, max(−b, d)) with b as the upper bounder and −b as the lower bound, d as the input. The restriction of equal magnitudes for the upper and lower bounder may be suboptimal.

10 Exemplary Methods for Temporal Prediction of Parameters in Non-Linear ALF

Embodiments of the presently disclosed technology overcome the drawbacks of existing implementations, thereby providing video coding with higher coding efficiencies. Temporal prediction of parameters in non-linear adaptive loop filtering, based on the disclosed technology, may enhance both existing and future video coding standards, is elucidated in the following examples described for various implementations. The examples of the disclosed technology provided below explain general concepts, and are not meant to be interpreted as limiting. In an example, unless explicitly indicated to the contrary, the various features described in these examples may be combined.

In these examples, one filter may be associated with multiple filter coefficients. One set of filters represents multiple filters. Denote the i-th filter by $F^i$ and its associated filter coefficients by $F^i k$, such as the variable k denotes the k-th filter coefficient associated with $F^i$, e.g., it may be corresponding to Ck in FIG. 2.

1. It is proposed to determine the NLALF parameters (e.g., on/off control flag, clipping parameters) according to coded information.
   a. The NLALF parameters (e.g., on/off control flag, clipping parameters) may be dependent on coded mode information.
      i. In one example, which NLALF parameters to be selected may be determined by the coded mode, such as intra or non-intra mode.
      ii. In one example, which NLALF parameters to be selected may be determined by the coded mode, such as intra or inter mode.
      iii. In one example, which NLALF parameters to be selected may be determined by the coded mode, such as IBC or non-IBC mode.
   b. The NLALF parameters (e.g., on/off control flag, clipping parameters) may be dependent on transform information.
      i. In one example, they may be dependent on whether transform skip is applied or not.
   c. The NLALF parameters (e.g., on/off control flag, clipping parameters) may be dependent on residual information.
      i. In one example, they may be dependent on whether the block contains non-zero coefficients.
   d. The NLALF parameters (e.g., on/off control flag, clipping parameters) may be dependent on tile group types/picture types.
   e. The NLALF parameters (e.g., on/off control flag, clipping parameters) may be dependent on temporal layer information/reference picture information associated with one tile/tile group/slice etc. al.
      i. In one example, they may be dependent on whether all reference pictures are associated with smaller POC values compared to current picture.
      ii. In one example, they may be dependent on whether all reference pictures are associated with smaller or equal POC values compared to current picture.
   f. It is proposed to determine the NLALF parameters (e.g., on/off control flag, clipping parameters) according to reference picture/motion information associated with one block.
2. It is proposed to determine the NLALF parameters (e.g., on/obiff control flag, clipping parameters) according to the geometric transformation.
   a. In one example, for two M×N blocks, even they are associated with the same filter (e.g., due to the same class index), the associated NLALF parameters (e.g., clipping parameters) may be different.
   b. In one example, for one filter coefficient, indications of more than one clipping parameter may be signaled.
      i. In one example, how many clipping parameters/or indices of clipping parameters or other representations of clipping parameters may be dependent on the number of allowed geometric transformations.
      ii. In one example, predictive coding of clipping parameters/indices of clipping parameters associated with one filter parameter may be applied.
         1) In one example, a clipping parameter of one filter for one sample or block may be predicted by another clipping parameter of another filter used for a spatial/temporal adjacent or non-adjacent neighbouring sample or block.
3. It is proposed that magnitudes of the upper bound and the lower bound in the clipping function may be unequal.
   a. In one example, indications of both upper bound and lower bound for one clipping function may be signaled.
      i. Alternatively, furthermore, predictive coding between upper bound and lower bound may be applied.
4. It is proposed to directly code the indications of clipping parameters (such as indices) with fixed length.
   a. In one example, each of them may be coded with N-bits (e.g., N is set to 2).
      i. In one example, N may be fixed;
      ii. In one example, N may be signaled;
      iii. In one example, N may depend on coding information, such as QP, picture dimensions and so on.
   b. Alternatively, they may be coded with truncated unary method with a maximum value N.
      i. In one example, N may be fixed;
      ii. In one example, N may be signaled;
      iii. In one example, N may depend on coding information, such as QP, picture dimensions and so on.
   c. Alternatively, they may be coded with Exponential-Golomb method but with fixed order for one filter/for one filter set.
   d. Alternatively, they may be coded with run-length coding.
      i. In one example, for each filter, the index of a clipping parameter may be firstly coded as 'run', and the number of consecutive same clipping parameter as 'length'.
      ii. In one example, for each k-th filter coefficient in all filters, the index of a clipping parameter associated with F' may be firstly coded as 'run', and the number of same clipping parameter in other filters as 'length'.
   e. In one example, predictive coding of indications of clipping parameters (such as indices) may be applied.
      i. In one example, predictive coding may be applied for clipping parameters within one filter.
      ii. In one example, predictive coding may be applied for clipping parameters among different filters.
         1) In one example, predictive coding may be applied for clipping parameters among different filters for one color component.
         2) In one example, predictive coding may be applied for clipping parameters among different filters for multiple color component.
         3) In one example, predictive coding may be applied for clipping parameters of filters used for different samples or blocks.
      iii. In one example, predictive coding may be applied for clipping parameters signaled in different APSs.
5. It is proposed to decouple the parsing of clipping parameters and construction of filter coefficients.

a. In one example, the parsing of clipping parameters (e.g., index of clipping parameters) is independent from the values of filter coefficients.

b. In one example, when the filter coefficient is equal to 0, indication of the associated clipping parameter may be still signaled.

6. When one block inherits filter coefficients from the i-th filter, the associated clipping parameters with the i-th filter may be not inherited.

a. In one example, when temporal prediction is enabled for one block, instead of directly inheriting the associated clipping parameters, whether to use non-local ALF or not (applying clipping or not) may be signaled.

i. In one example, if it is determined to apply clipping, the associated clipping parameters may be also inherited.

b. In one example, suppose the filter coefficients are inherited/predicted from the i-th filter, the clipping parameters are inherited/predicted from the j-th filter, i may be unequal to j.

c. In one example, suppose the filter coefficients are inherited/predicted from the i-th filter, the clipping parameters are inherited/predicted from the j-th filter, the i-th and j-th filter may be associated with different filter set.

i. In one example, the i-th filter may be associated with a first picture/tile group/tile/slice and the j-th filter may be associated with a second picture/tile group/tile/slice.

ii. In one example, i is unequal to j. Alternatively, i is equal to j.

d. In one example, indications of clipping parameters associated with which filter may be signaled, such as the filter index.

e. In one example, indications of clipping parameters associated with which filter set may be signaled, such as the APS index.

i. Alternatively, furthermore, the filter index may be further signalled.

7. In the classification process, instead of directly using the sample difference, the clipped sample difference may be utilized.

a. In one example, in the gradient calculation process, clipped sample difference or clipped gradients may be used.

b. In one example, in the activity calculation process, clipped sample difference or clipped gradients may be used.

c. In one example, the following may be used to calculate the vertical gradient:

$V_{k,l} = |clip1(R(k,l) - R(k,l-1)) + clip2(R(k,l) - R(k,l+1))|$ wherein clip1 and clip2 are two clipping functions.

d. In one example, the following may be used to calculate the horizontal gradient:

$H_{k,l} = |clip1(R(k,l) - md\ R(k-l,1)) + clip2(R(k,l) - R(k+1,l))|$ wherein clip1 and clip2 are two clipping functions.

8. Whether to apply the clipping operations may depend on the locations of the samples (such as I(x+i, y+j) in Section 5.2) to be used in the filtering process.

a. In one example, if the sample in a filter support is not located a CU/PU/TU/picture/tile/tile group boundary, clipping may be disabled.

b. In one example, if the sample in a filter support is located a CU/PU/TU/picture/tile/tile group/CTU/Virtual Pipelining Data Unit (VPDU) boundary, clipping may be applied.

c. Alternatively, whether to apply the clipping operations may depend on the distance of the samples (such as I(x+i, y+j) in Section 5.2) to be used in the filtering process from the CU/PU/TU/picture/tile/tile group/CTU/VPDU boundary.

i. In one example, the distance may be pre-defined (e.g., N-pel).

ii. In one example, the distance may be signaled.

9. The filter shape (a.k.a. filter support) used in adaptive loop filter process may depend on the color representation.

a. In one example, the filter support for all components (such as Y, Cb, Cr) should be the same when the color format is 4:4:4.

i. For example, the filter support is 7*7 diamond as shown in FIG. 2B.

ii. For example, the filter support is 5*5 diamond as shown in FIG. 2A.

b. In one example, the support area for all components when the color format is RGB.

i. For example, the filter support is 7*7 diamond as shown in FIG. 2B.

ii. For example, the filter support is 5*5 diamond as shown in FIG. 2A.

The examples described above may be incorporated in the context of the method described below, e.g., methods 800, 810 and 820, which may be implemented at a video decoder or a video encoder.

Figure 8A:
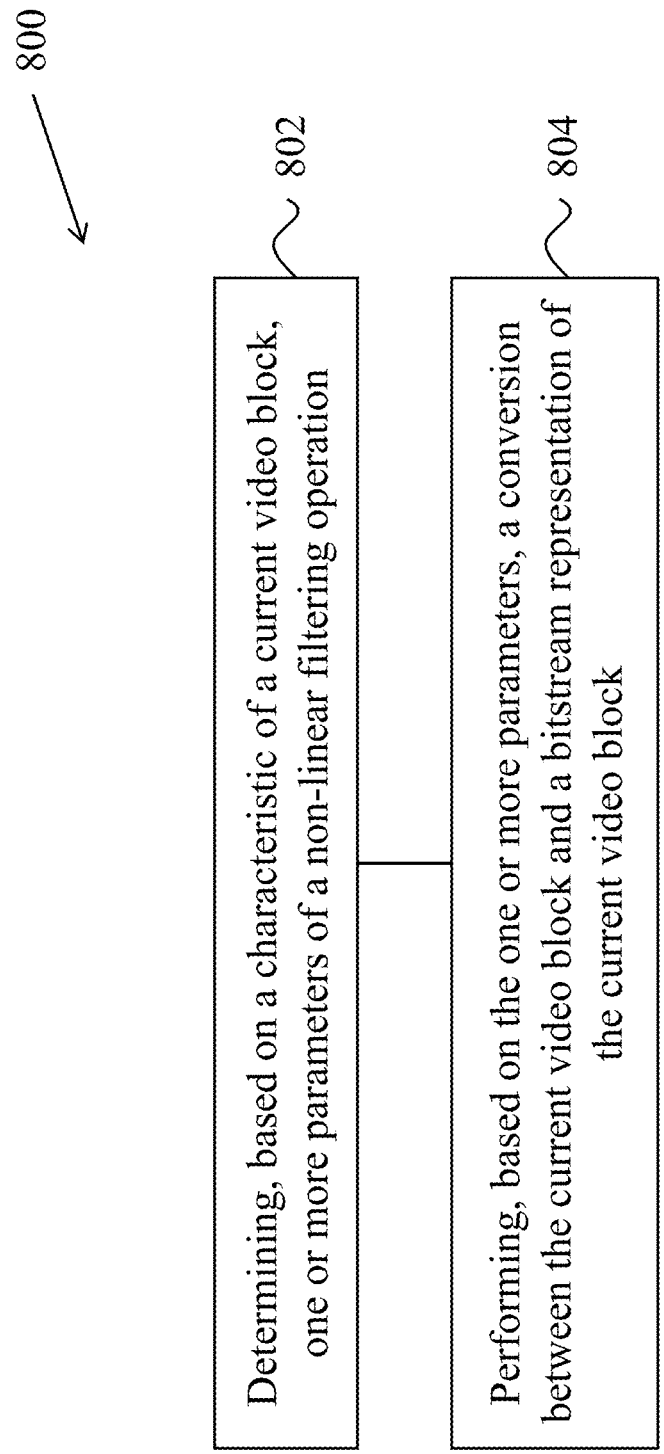
FIGS. 8A-8C show flowcharts of exemplary methods for the temporal prediction of parameters in non-linear adaptive loop filtering.

FIG. 8A shows a flowchart of an exemplary method for video processing. The method 800 includes, at step 802, determining, based on a characteristic of a current video block, one or more parameters of a non-linear filtering operation.

The method 800 includes, at step 804, performing, based on the one or more parameters, a conversion between the current video block and a bitstream representation of the current video block.

In some embodiments, the characteristic of the current video block is a coding mode of the current video block. In an example, the coding mode of the current video block is an intra mode, a non-intra mode, an intra block copy (IBC) mode or a non-IBC mode.

In some embodiments, the characteristic is transform information. In an example, the transform information comprises an indication of transform skip being applied to the current video block.

In some embodiments, the characteristic is residual information. In an example, the residual information comprises zero-valued coefficients in the current video block.

In some embodiments, the characteristic is a tile group type or a picture type of a tile group or a picture comprising the current video block.

In some embodiments, the characteristic is temporal layer information or reference information associated with a tile, a tile group, a picture or a slice comprising the current video block.

In some embodiments, the characteristic is a reference picture or motion information associated with the current video block.

In some embodiments, the characteristic is a geometric transformation.

In some embodiments, the one or more parameters comprises an on/off control flag or one or more parameters of a clipping function.

In some embodiments, a magnitude of an upper bound of the clipping function is different from a magnitude of a lower bound of the clipping function. In an example, predictive coding is applied between the upper bound and the lower bound of the clipping function.

Figure 8B:
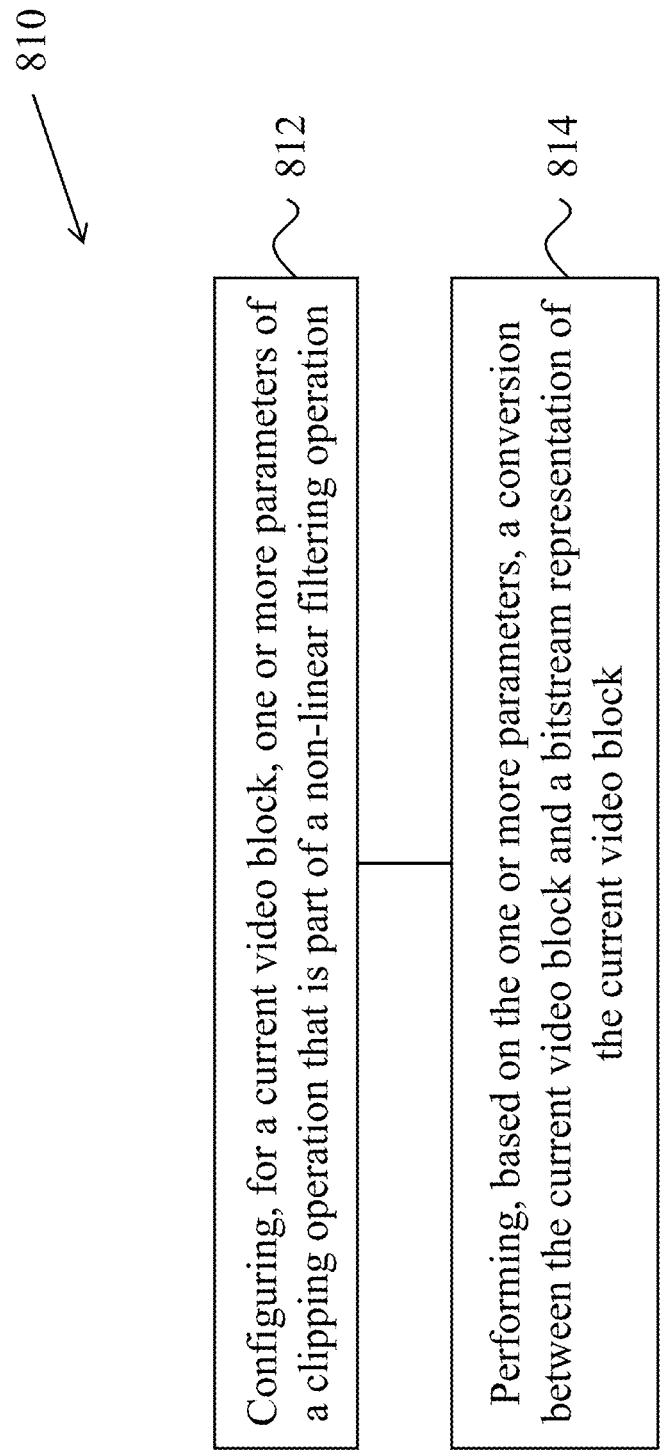

FIG. 8B shows a flowchart of an exemplary method for video processing. The method 810 includes, at step 812, configuring, for a current video block, one or more parameters of a clipping operation that is part of a non-linear filtering operation.

The method 810 includes, at step 814, performing, based on the one or more parameters, a conversion between the current video block and a bitstream representation of the current video block.

In some embodiments, the one or more parameters is coded with a fixed length of N bits. In other embodiments, the one or more parameters is coded with a truncated unary method with a maximum value of N. In an example, N is fixed. In another example, N is signaled. In yet another example, N is based on coded information of the current video block that comprises a quantization parameter or a dimension of the picture comprising the current video block.

In some embodiments, the one or more parameters is coded with an Exponential-Golomb method with a fixed order for one filter or filter set.

In some embodiments, the one or more parameters is coded with run-length coding.

In some embodiments, the one or more parameters is signaled independently from values of at least one filter coefficient.

In some embodiments, the one or more parameters further comprises filter coefficients, wherein the current video block inherits the filter coefficients from an i-th filter, and wherein the one or more parameters of the clipping function are inherited from a j-th filter that is different from the i-th filter.

Figure 8C:
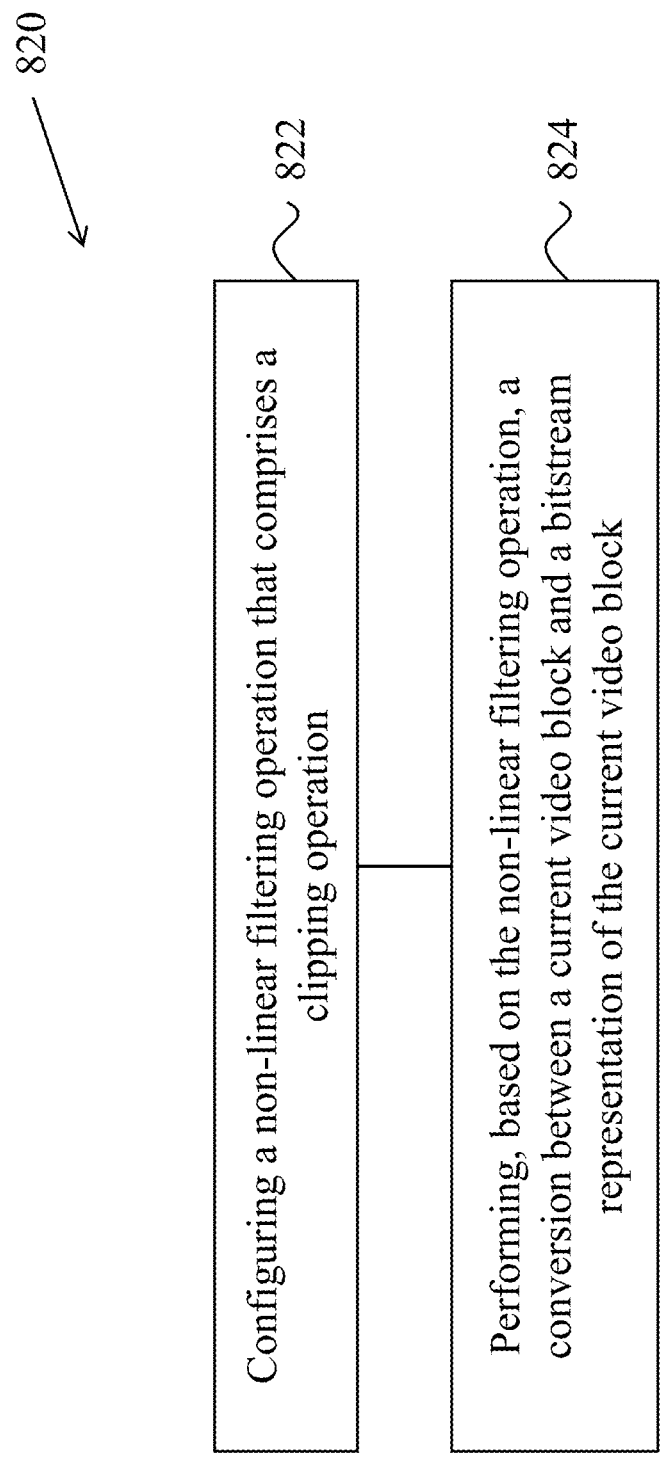

FIG. 8C shows a flowchart of an exemplary method for video processing. The method 820 includes, at step 822, configuring a non-linear filtering operation that comprises a clipping operation.

The method 820 includes, at step 824, performing, based on the non-linear filtering operation, a conversion between a current video block and a bitstream representation of the current video block.

In some embodiments, the method 820 further includes the step of performing a gradient calculation process that uses a clipped sample difference or a clipped gradient generated using the clipping operation. In other embodiments, the method 820 further includes the step of performing an activity calculation process that uses a clipped sample difference or a clipped gradient generated using the clipping operation. In an example, the clipped gradient comprises a vertical gradient that is computed as $V_{k,l}=|\text{clip1}(R(k,l)-R(k,l-1))+\text{clip2}(R(k,l)-R(k,l+1))|$. In another example, the clipped gradient comprises a horizontal gradient that is computed as $H_{k,l}=|\text{clip1}(R(k,l)-R(k-1,l))+\text{clip2}(R(k,l)-R(k+1,l))|$, where clip1 and clip2 are a first and a second clipping function, respectively.

In some embodiments, performing the conversion comprises filtering one or more samples of the current video block, and an operation of the clipping operation is configured based on a location of the one or more samples.

In some embodiments, the location of the one or more samples is a boundary of a coding unit (CU), a prediction unit (PU), a transform unit (TU), a picture, a tile, a tile group, a coding tree unit (CTU) or a virtual pipelining data unit (VPDU).

In some embodiments, and in the context of methods 800, 810 and 820, a shape of a filter used in the non-linear filtering operation is based on a color representation. In an example, the color representation comprises a 4:4:4 color format or an RGB color format. In another example, the filter is a diamond shaped filter.

In some embodiments, and in the context of methods 800, 810 and 820, the non-linear filtering operation is a non-linear adaptive loop filtering operation.

11 Example Implementations of the Disclosed Technology

Figure 9:
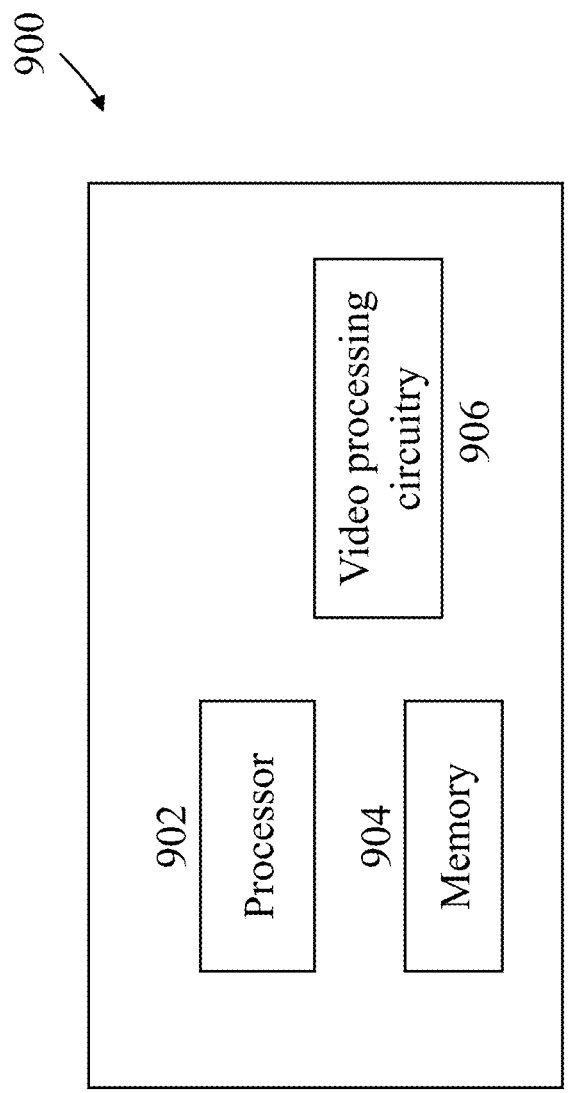
FIG. 9 is a block diagram of an example of a hardware platform for implementing a video decoding or a video encoding technique described in the present document.

FIG. 9 is a block diagram of a video processing apparatus 900. The apparatus 900 may be used to implement one or more of the methods described herein. The apparatus 900 may be embodied in a smartphone, tablet, computer, Internet of Things (IoT) receiver, and so on. The apparatus 900 may include one or more processors 902, one or more memories 904 and video processing hardware 906. The processor(s) 902 may be configured to implement one or more methods (including, but not limited to, methods 800, 810 and 820) described in the present document. The memory (memories) 904 may be used for storing data and code used for implementing the methods and techniques described herein. The video processing hardware 906 may be used to implement, in hardware circuitry, some techniques described in the present document.

In some embodiments, the video coding methods may be implemented using an apparatus that is implemented on a hardware platform as described with respect to FIG. 9.

Figure 10:
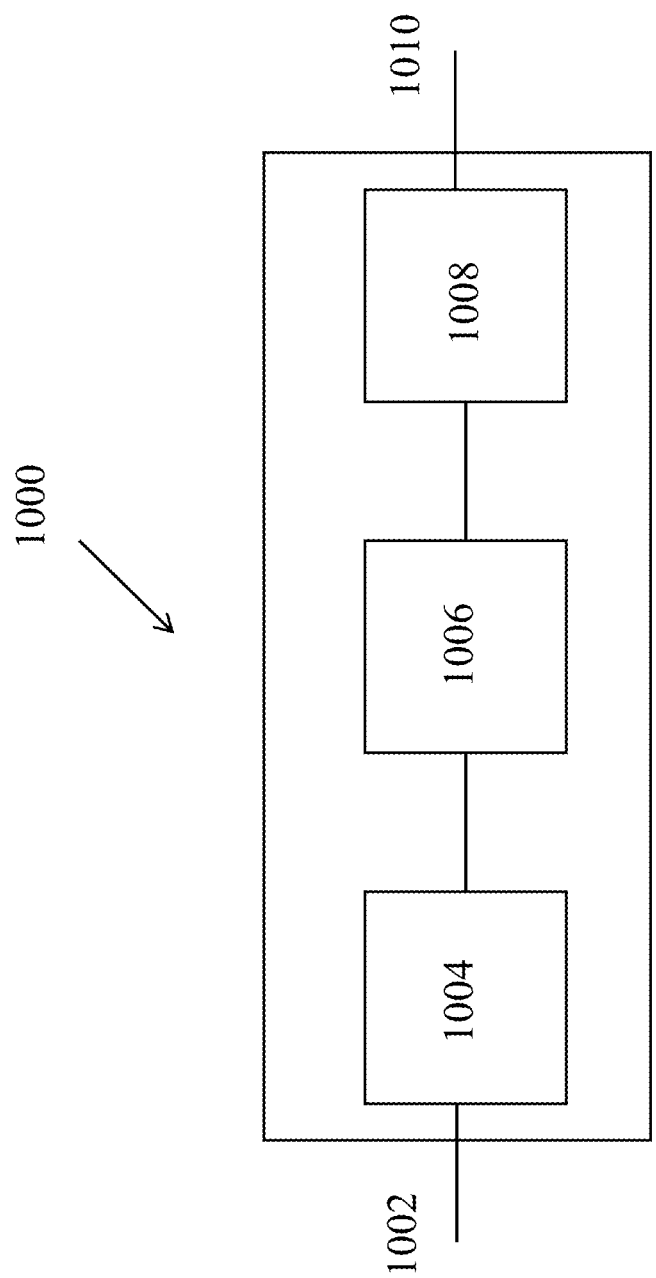
FIG. 10 is a block diagram of an example video processing system in which disclosed techniques may be implemented.

FIG. 10 is a block diagram showing an example video processing system 1000 in which various techniques disclosed herein may be implemented. Various implementations may include some or all of the components of the system 1000. The system 1000 may include input 1002 for receiving video content. The video content may be received in a raw or uncompressed format, e.g., 8 or 10 bit multi-component pixel values, or may be in a compressed or encoded format. The input 1002 may represent a network interface, a peripheral bus interface, or a storage interface. Examples of network interface include wired interfaces such as Ethernet, passive optical network (PON), etc. and wireless interfaces such as Wi-Fi or cellular interfaces.

The system 1000 may include a coding component 1004 that may implement the various coding or encoding methods described in the present document. The coding component 1004 may reduce the average bitrate of video from the input 1002 to the output of the coding component 1004 to produce a coded representation of the video. The coding techniques are therefore sometimes called video compression or video transcoding techniques. The output of the coding component 1004 may be either stored, or transmitted via a communication connected, as represented by the component 1006. The stored or communicated bitstream (or coded) representation of the video received at the input 1002 may be used by the component 1008 for generating pixel values or displayable video that is sent to a display interface 1010. The process of generating user-viewable video from the bitstream representation is sometimes called video decompression. Furthermore, while certain video processing operations are referred to as "coding" operations or tools, it will be appreciated that the coding tools or operations are used at an encoder and corresponding decoding tools or operations that reverse the results of the coding will be performed by a decoder.

Examples of a peripheral bus interface or a display interface may include universal serial bus (USB) or high definition multimedia interface (HDMI) or Displayport, and so on. Examples of storage interfaces include SATA (serial advanced technology attachment), PCI, IDE interface, and the like. The techniques described in the present document may be embodied in various electronic devices such as mobile phones, laptops, smartphones or other devices that are capable of performing digital data processing and/or video display.

Figure 11:
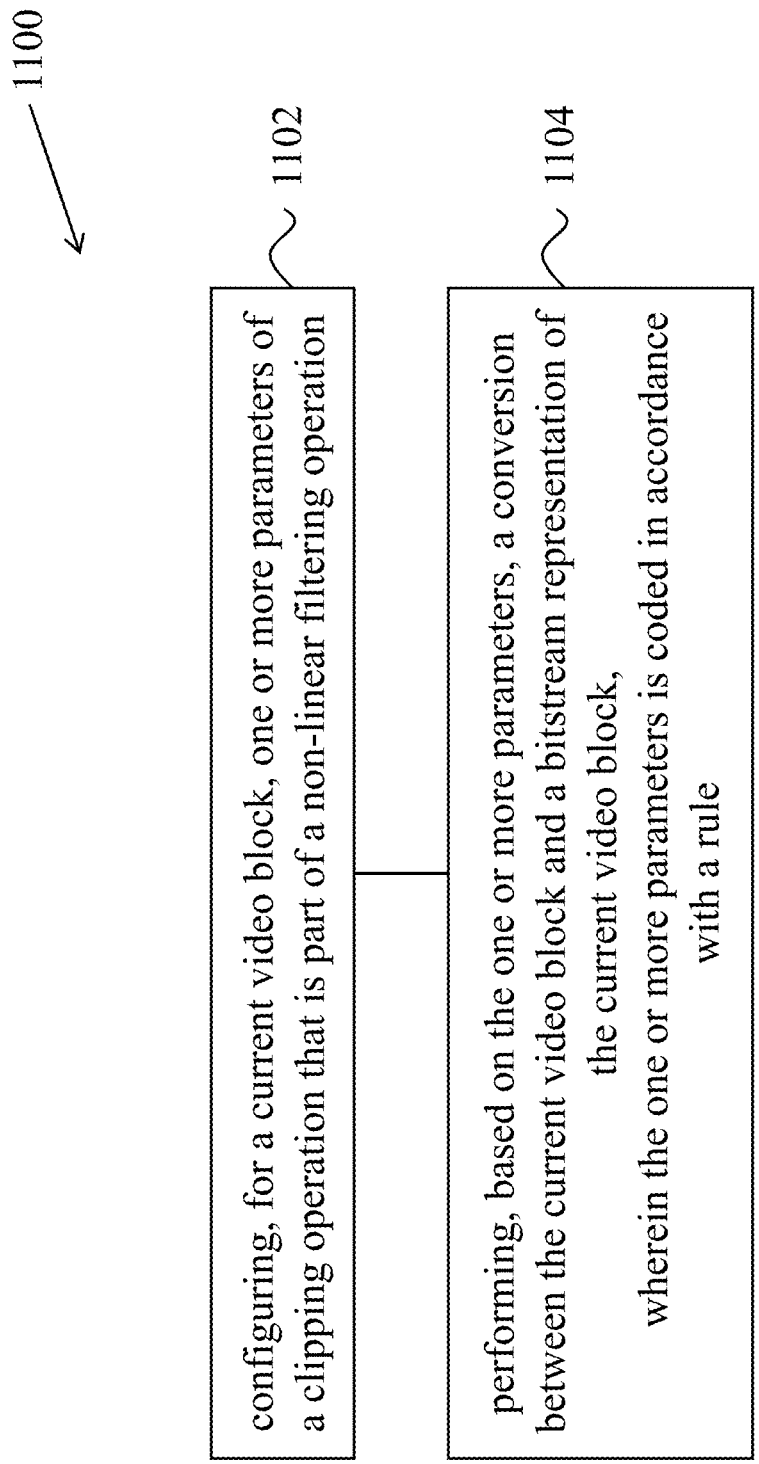
FIG. 11 shows a flowchart of an example method for visual media processing.

FIG. 11 shows a flowchart of an example method for visual media processing. Steps of this flowchart are discussed in connection with example 4 in Section 10 of this document. At step 1102, the process configures, for a current video block, one or more parameters of a clipping operation that is part of a non-linear filtering operation. At step 1104, the process performs, based on the one or more parameters, a conversion between the current video block and a bitstream representation of the current video block, wherein the one or more parameters is coded in accordance with a rule.

Figure 12:
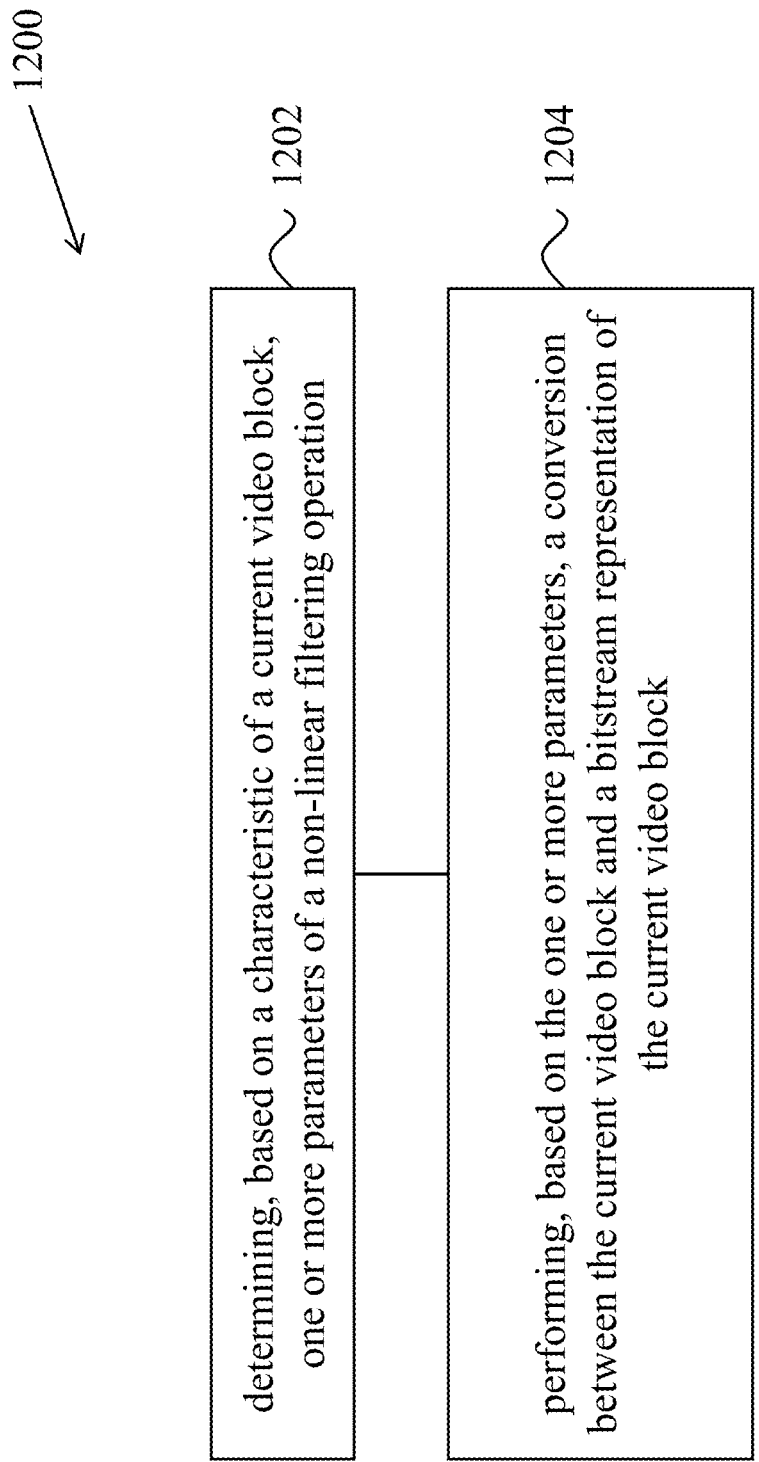
FIG. 12 shows a flowchart of an example method for visual media processing.

FIG. 12 shows a flowchart of an example method for visual media processing. Steps of this flowchart are discussed in connection with example 1 in Section 10 of this document. At step 1202, the process determines, based on a characteristic of a current video block, one or more parameters of a non-linear filtering operation. At step 1204, the process performs, based on the one or more parameters, a conversion between the current video block and a bitstream representation of the current video block.

Figure 13:
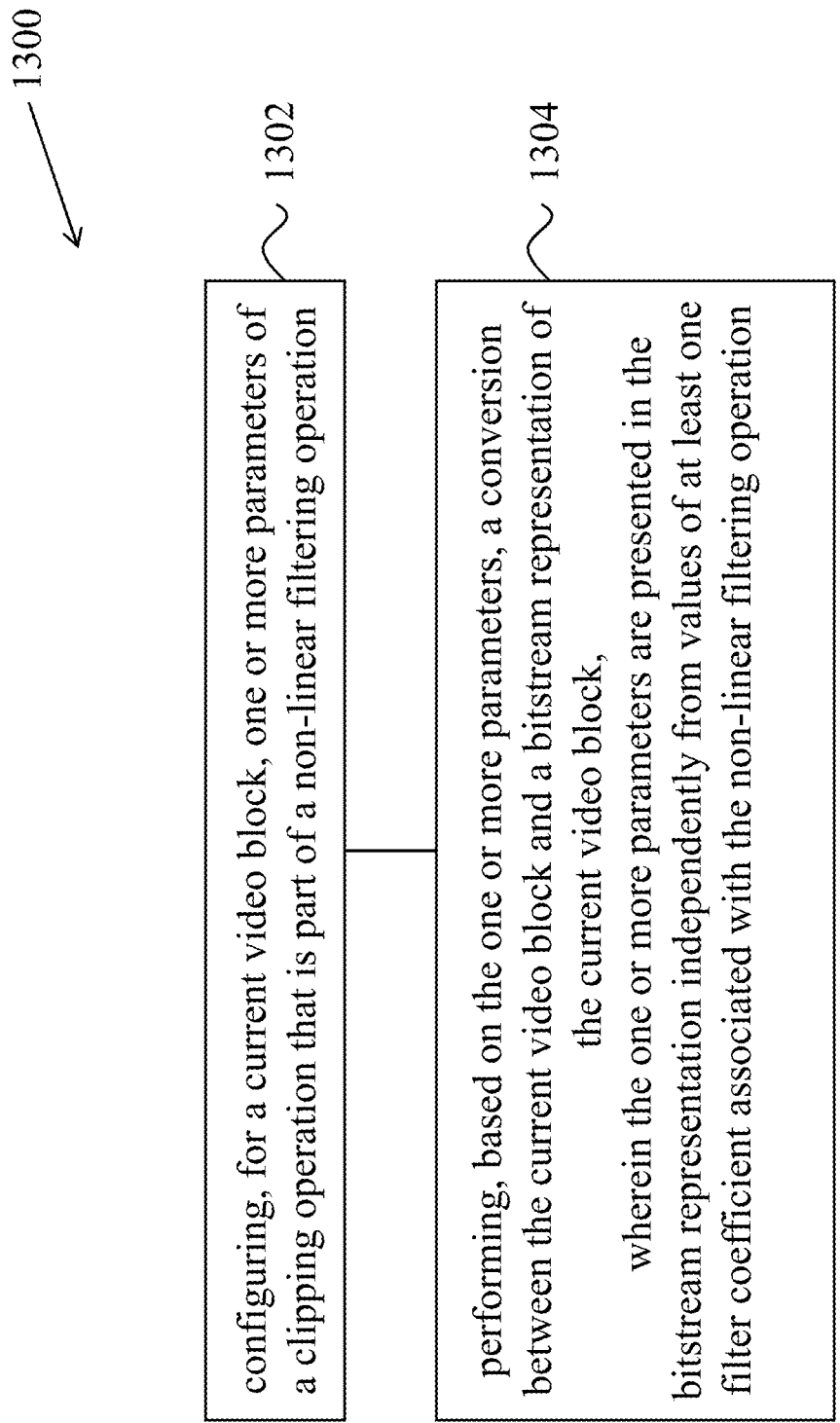
FIG. 13 shows a flowchart of an example method for visual media processing.

FIG. 13 shows a flowchart of an example method for visual media processing. Steps of this flowchart are discussed in connection with example 5 in Section 10 of this document. At step 1302, the process configures, for a current video block, one or more parameters of a clipping operation that is part of a non-linear filtering operation. At step 1304, the process performs, based on the one or more parameters, a conversion between the current video block and a bitstream representation of the current video block, wherein the one or more parameters are presented in the bitstream representation independently from values of at least one filter coefficient associated with the non-linear filtering operation.

Figure 14:
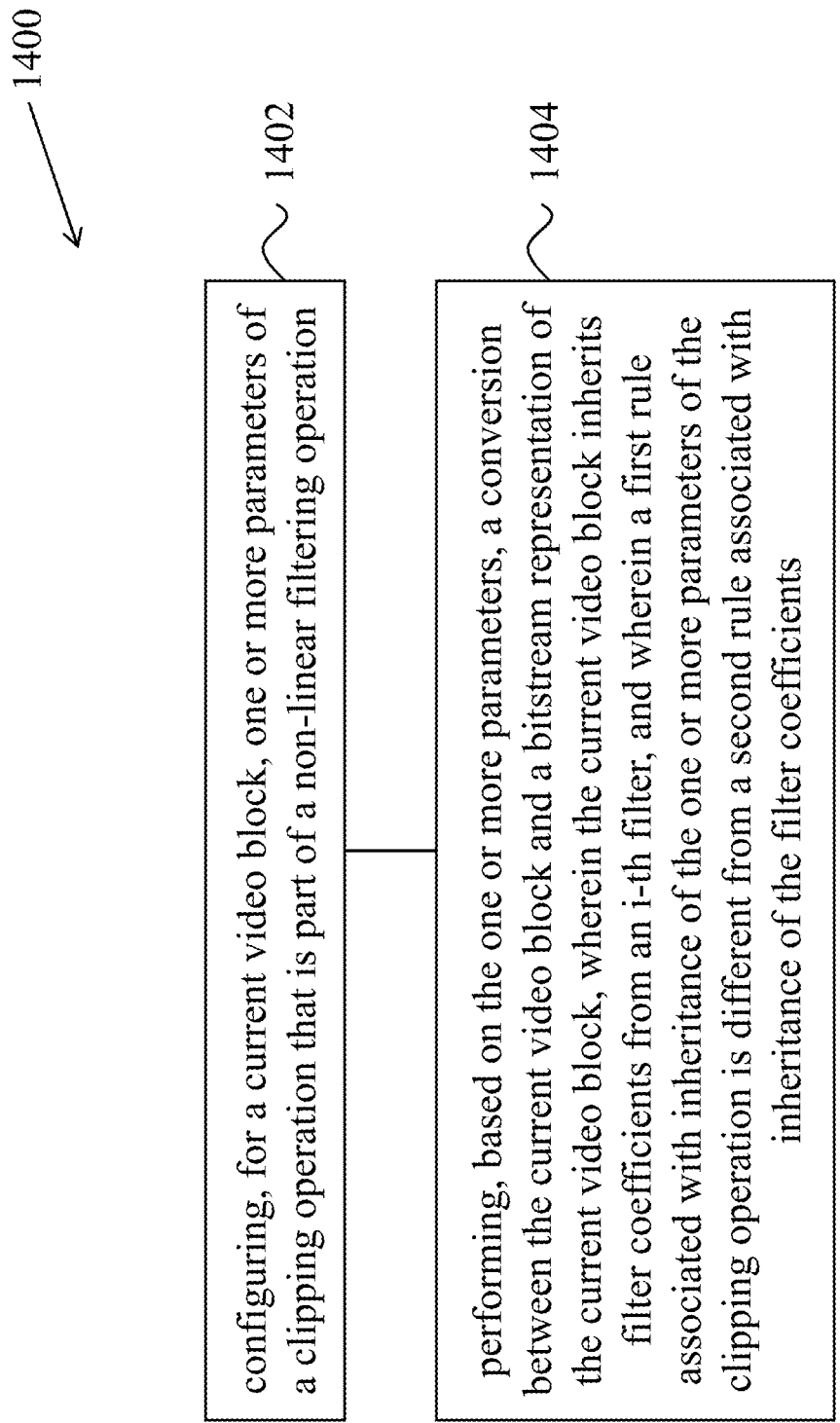
FIG. 14 shows a flowchart of an example method for visual media processing.

FIG. 14 shows a flowchart of an example method for visual media processing. Steps of this flowchart are discussed in connection with example 6 in Section 10 of this document. At step 1402, the process configures, for a current video block, one or more parameters of a clipping operation that is part of a non-linear filtering operation. At step 1404, the process performs, based on the one or more parameters, a conversion between the current video block and a bitstream representation of the current video block, wherein the current video block inherits filter coefficients from an i-th filter, and wherein a first rule associated with inheritance of the one or more parameters of the clipping operation is different from a second rule associated with inheritance of the filter coefficients.

Various embodiments discussed herein are now presented in clause-based format.

A1. A method for visual media processing, comprising:
configuring, for a current video block, one or more parameters of a clipping operation that is part of a non-linear filtering operation; and
performing, based on the one or more parameters, a conversion between the current video block and a bitstream representation of the current video block, wherein the one or more parameters is coded in accordance with a rule.

A2. The method of clause A1, wherein the rule specifies coding the one or more parameters with a fixed length of N bits.

A3. The method of clause A1, wherein the rule specifies coding the one or more parameters with a truncated unary method based on a maximum value of N.

A4. The method of any one or more of clauses A1-A3, wherein N is fixed.

A5. The method of any one or more of clauses A1-A3, wherein N is signaled in the bitstream representation.

A6. The method of any one or more of clauses A1-A3, wherein N is based on coded information of the current video block that comprises a quantization parameter or a dimension of the picture comprising the current video block.

A7. The method of clause A1, wherein the non-linear filtering operation is based on a filter, wherein the rule specifies coding the one or more parameters with an Exponential-Golomb method with a fixed order for one filter or filter set.

A8. The method of clause A1, wherein the rule specifies coding the one or more parameters based on a run-length coding method.

A9. The method of clause A5, wherein the rule further specifies that a run of the run-length coding method corresponds to an index of the one or more parameters and a length of the run-length coding method corresponds to a number of consecutive parameters of the one or more parameters that are same.

A10. The method of clause A1, wherein the rule specifies coding the one or more parameters based on predictive coding.

A11. The method of clause A10, wherein the predictive coding is applied for the one or more parameters within one filter.

A12. The method of clause A10, wherein the predictive coding is applied for the one or more parameters among different filters.

A13. The method of clause A12, wherein the predictive coding is applied for the one or more parameters among different filters used for one color component.

A14. The method of clause A12, wherein the predictive coding is applied for the one or more parameters among different filters used for different color components.

A15. The method of clause A12, wherein the predictive coding is applied for the one or more parameters among different filters used for different samples of the current video block.

A16. The method of clause A12, wherein the predictive coding is applied for the one or more parameters among different filters used for different video blocks.

A17. The method of clause A11, wherein the one or more parameters are included as fields in different adaptive parameters sets (APSs).

A18. The method of any one or more of clauses A1 to A17, wherein the non-linear filtering operation is an adaptive loop filter (ALF) operation which comprises determining a filter index based on gradient calculations in different directions.

A19. The method of any one or more of clauses A1 to A17, wherein the one or more parameters includes a clipping index.

B1. A method for visual media processing, comprising:
determining, based on a characteristic of a current video block, one or more parameters of a non-linear filtering operation; and performing, based on the one or more parameters, a conversion between the current video block and a bitstream representation of the current video block.

B2. The method of clause B1, wherein the characteristic of the current video block is a coding mode of the current video block.

B3. The method of clause B2, wherein the coding mode of the current video block is an intra mode, a non-intra mode, an intra block copy (IBC) mode or a non-IBC mode.

B4. The method of clause B1, wherein the characteristic is transform information.

B5. The method of clause B4, wherein the transform information comprises an indication of transform skip being applied to the current video block.

B6. The method of clause B1, wherein the characteristic is residual information.

B7. The method of clause B6, wherein the residual information comprises zero-valued coefficients in the current video block.

B8. The method of clause B1, wherein the characteristic is a tile group type or a picture type of a tile group or a picture comprising the current video block.

B9. The method of clause B1, wherein the characteristic is temporal layer information or reference information associated with a tile, a tile group, a picture or a slice comprising the current video block.

B10. The method of clause B1, wherein the characteristic is a reference picture or motion information associated with the current video block.

B11. The method of clause B1, wherein the characteristic is a geometric transformation.

B12. The method of any one or more of clauses B1 to B11, wherein the one or more parameters comprises an on/off control flag and/or one or more parameters of a clipping function.

B13. The method of clause B12, wherein a magnitude of an upper bound of the clipping function is different from a magnitude of a lower bound of the clipping function.

B14. The method of clause B13, wherein predictive coding is applied between the upper bound and the lower bound of the clipping function.

B15. The method of clause B12, wherein the upper bound of the clipping function and the lower bound of the clipping function are included as fields in the bitstream representation.

B16. The method of clause B10, wherein the non-linear filtering operation includes use of a first filter and a second filter, and wherein the one or more parameters of the second filter are predicted using the one or more parameters of the first filter.

B17. The method of clause B10, wherein the first filter and the second filter are applied on different sets of samples of the current video block.

B18. The method of clause B10, wherein the first filter and the second filter are applied on samples associated with different video blocks.

B19. The method of any one or more of clauses A1 to B18, wherein a shape of a filter used in the non-linear filtering operation is based on a color representation of a sample associated with the current video block.

B20. The method of clause B19, wherein the color representation comprises a 4:4:4 color format or an RGB color format.

B21. The method of clause B19, wherein the filter is a diamond shaped filter.

B22. The method of clause B19, wherein the diamond shaped filter is of size 5×5 or 7×7.

B23. The method of any one or more of clauses B1 to B22, wherein the non-linear filtering operation is a non-linear adaptive loop filtering operation.

B24. The method of any one or more of clauses B1 to B23, wherein the non-linear filtering operation is an adaptive loop filter (ALF) operation which comprises determining a filter index based on gradient calculations in different directions.

B25. The method of any one or more of clauses B1 to B23, wherein the one or more parameters includes a clipping index.

B26. The method of any of clauses A1-B25, wherein the conversion includes generating the bitstream representation from the current video block.

B27. The method of any of clauses A1-B25, wherein the conversion includes generating pixel values of the current video block from the bitstream representation.

B28. A video encoder apparatus comprising a processor configured to implement a method recited in any one or more of clauses A1-B25.

B29. A video decoder apparatus comprising a processor configured to implement a method recited in any one or more of clauses A1-B25.

B30. A computer readable medium having code stored thereon, the code embodying processor-executable instructions for implementing a method recited in any of or more of clauses A1-B25.

C1. A method for visual media processing, comprising:
configuring, for a current video block, one or more parameters of a clipping operation that is part of a non-linear filtering operation; and
performing, based on the one or more parameters, a conversion between the current video block and a bitstream representation of the current video block, wherein the one or more parameters are presented in the bitstream representation independently from values of at least one filter coefficient associated with the non-linear filtering operation.

C2. The method of clause C1, wherein the one or more parameters are presented in the bitstream representation in case that a value of the at least one filter coefficient is zero.

C3. The method of any one or more of clauses C1-C2, wherein the one or more parameters are presented in the bitstream representation regardless of the value of the at least one filter coefficient.

C4. The method of any one or more of clauses C1 to C3, wherein the non-linear filtering operation is an adaptive loop filter (ALF) operation which comprises determining a filter index based on gradient calculations in different directions.

C5. The method of any one or more of clauses C1 to C3, wherein the one or more parameters includes a clipping index.

D1. A method for visual media processing, comprising:
configuring, for a current video block, one or more parameters of a clipping operation that is part of a non-linear filtering operation; and
performing, based on the one or more parameters, a conversion between the current video block and a bitstream representation of the current video block, wherein the current video block inherits filter coefficients from an i-th filter, and wherein a first rule associated with inheritance of the one or more parameters of the clipping operation is different from a second rule associated with inheritance of the filter coefficients.

D2. The method of clause D1, wherein the first rule specifies excluding inheritance of the one or more parameters of the clipping operation from the i-th filter.

D3. The method of clause D1, further comprising:
upon identifying that temporal prediction is enabled for the current video block, making a determination of whether to apply or disable the clipping operation.

D4. The method of clause D1, further comprising:
upon identifying that temporal prediction is enabled for the current video block, making a determination of whether to apply or exclude inheritance of the one or more parameters of the clipping operation.

D5. The method of clause D1, wherein the first rule specifies inheriting the one or more parameters of the clipping operation from a j-th filter.

D6. The method of clause D1, wherein the first rule specifies inheriting the one or more parameters of the clipping operation from the j-th filter, and wherein the j-th filter and the i-th filter are associated with different filter sets.

D7. The method of clause D6, wherein the j-th filter and the i-th filter are associated with different pictures and/or tile groups and/or tiles and/or slices.

D8. The method of clause D6, wherein the j-th filter and the i-th filter are same.

D9. The method of clause D5, wherein the j-th filter and the i-th filter are different.

D10. The method of clause D1, wherein the first rule specifies including the one or more parameters of the clipping operation as fields in the bitstream representation.

D11. The method of clause D10, wherein the fields include an adaptive parameter set (APS) index.

D12. The method of any one or more of clauses D1-D11, wherein the clipping operation includes computing a clipped sample difference or a clipping gradient.

D13. The method of clause D12, wherein the clipped gradient comprises a vertical gradient that is computed as $V\_(k,l)=|clip1(R(k,l)-R(k,l-1))+clip2(R(k,l)-R(k,l+1))|,$ wherein clip1 and clip2 are a first and a second clipping function, respectively and R(i, j) denotes a sample of the current video block.

D14. The method of clause D12, wherein the clipped gradient comprises a horizontal gradient that is computed as $H\_(k,l)=|clip1(R(k,l)-R(k-1,l))+clip2(R(k,l)-R(k+1,l))|,$ wherein clip1 and clip2 are a first and a second clipping function, respectively and R(i, j) denotes a sample of the current video block.

D15. The method of any one or more of clauses D1 to D14, further comprising:
making a determination, based on a location of a sample used in the filtering operation, of whether to selectively enable or disable the clipping operation.

D16. The method of clause D15, wherein the clipping operation is disabled if the sample is not located at a boundary of one or more of the following: a coding unit, a partition unit, a transform unit, a picture, a tile, or a tile group.

D17. The method of clause D15, wherein the clipping operation is enabled if the sample is located at a boundary of one or more of the following: a coding unit, a partition unit, a transform unit, a picture, a tile, a tile group, a coding tree unit, or a virtual pipelining data unit.

D18. The method of clause D15, wherein the location is with respect to a distance between the sample and a boundary of one or more of the following: a coding unit, a partition unit, a transform unit, a picture, a tile, a tile group, a coding tree unit, or a virtual pipelining data unit.

D19. The method of clause D18, wherein the distance is pre-defined.

D20. The method of clause D18, wherein the distance is signaled in the bitstream representation.

D21. The method of any one or more of clauses D1 to D20, wherein a shape of a filter used in the non-linear filtering operation is based on a color representation of a sample associated with the current video block.

D22. The method of clause D21, wherein the color representation comprises a 4:4:4 color format or an RGB color format.

D23. The method of clause D21, wherein the filter is a diamond shaped filter.

D24. The method of clause D23, wherein the diamond shaped filter is of size 5×5 or 7×7.

D25. The method of any one or more of clauses D1 to D24, wherein the non-linear filtering operation is an adaptive loop filtering (ALF) operation which comprises determining a filter index based on gradient calculations in different directions.

D26. The method of any one or more of clauses D1 to D24, wherein the one or more parameters includes a clipping index.

D27. The method of any of clauses C1-D26, wherein the conversion includes generating the bitstream representation from the current video block.

D28. The method of any of clauses C1-D26, wherein the conversion includes generating pixel values of the current video block from the bitstream representation.

D29. A video encoder apparatus comprising a processor configured to implement a method recited in any one or more of clauses C1-D26.

D30. A video decoder apparatus comprising a processor configured to implement a method recited in any one or more of clauses C1-D26.

D31. A computer readable medium having code stored thereon, the code embodying processor-executable instructions for implementing a method recited in any of or more of clauses C1-D26.

In the present document, the term "video processing" or "visual media processing" or "processing of visual media" may refer to video encoding, video decoding, video compression or video decompression. For example, video compression algorithms may be applied during conversion from pixel representation of a video to a corresponding bitstream representation or vice versa. The bitstream representation of a current video block may, for example, correspond to bits that are either co-located or spread in different places within the bitstream, as is defined by the syntax. For example, a macroblock may be encoded in terms of transformed and coded error residual values and also using bits in headers and other fields in the bitstream. Furthermore, during conversion, a decoder may parse a bitstream with the knowledge that some fields may be present, or absent, based on the determination, as is described in the above solutions. Similarly, an encoder may determine that certain syntax fields are or are not to be included and generate the coded representation accordingly by including or excluding the syntax fields from the coded representation.

From the foregoing, it will be appreciated that specific embodiments of the presently disclosed technology have been described herein for purposes of illustration, but that various modifications may be made without deviating from the scope of the invention. Accordingly, the presently disclosed technology is not limited except as by the appended claims.

Implementations of the subject matter and the functional operations described in this patent document can be implemented in various systems, digital electronic circuitry, or in computer software, firmware, or hardware, including the structures disclosed in this specification and their structural equivalents, or in combinations of one or more of them. Implementations of the subject matter described in this specification can be implemented as one or more computer program products, i.e., one or more modules of computer program instructions encoded on a tangible and non-transitory computer readable medium for execution by, or to control the operation of, data processing apparatus. The computer readable medium can be a machine-readable storage device, a machine-readable storage substrate, a memory device, a composition of matter effecting a machine-readable propagated signal, or a combination of one or more of them. The term "data processing unit" or "data processing apparatus" encompasses all apparatus, devices, and machines for processing data, including by way of example a programmable processor, a computer, or multiple processors or computers. The apparatus can include, in addition to hardware, code that creates an execution environment for the computer program in question, e.g., code that constitutes processor firmware, a protocol stack, a database management system, an operating system, or a combination of one or more of them.

A computer program (also known as a program, software, software application, script, or code) can be written in any form of programming language, including compiled or interpreted languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

Processors suitable for the execution of a computer program include, by way of example, both general and special purpose microprocessors, and any one or more processors of any kind of digital computer. Generally, a processor will receive instructions and data from a read only memory or a random access memory or both. The essential elements of a computer are a processor for performing instructions and one or more memory devices for storing instructions and data. Generally, a computer will also include, or be operatively coupled to receive data from or transfer data to, or both, one or more mass storage devices for storing data, e.g., magnetic, magneto optical disks, or optical disks. However, a computer need not have such devices. Computer readable media suitable for storing computer program instructions and data include all forms of nonvolatile memory, media and memory devices, including by way of example semiconductor memory devices, e.g., EPROM, EEPROM, and flash memory devices. The processor and the memory can be supplemented by, or incorporated in, special purpose logic circuitry.

It is intended that the specification, together with the drawings, be considered exemplary only, where exemplary means an example. As used herein, the singular forms "a", "an" and "the" are intended to include the plural forms as well, unless the context clearly indicates otherwise. Additionally, the use of "or" is intended to include "and/or", unless the context clearly indicates otherwise.

While this patent document contains many specifics, these should not be construed as limitations on the scope of any invention or of what may be claimed, but rather as descriptions of features that may be specific to particular embodiments of particular inventions. Certain features that are described in this patent document in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. Moreover, the separation of various system components in the embodiments described in this patent document should not be understood as requiring such separation in all embodiments.

Only a few implementations and examples are described and other implementations, enhancements and variations can be made based on what is described and illustrated in this patent document.

What is claimed is:

1. A method of processing video data, comprising:
determining, that a non-linear filtering operation is applied for a current video region of a video;
generating at least one first filtering index for the current video region;
deriving a first filtering coefficient set based on the at least one first filtering index and at least one coefficient parameter syntax element;
deriving a first clipping parameter set based on the at least one first filtering index and at least one filtering clipping syntax element;
performing the non-linear filtering operation based on the first filtering coefficient set and the first clipping parameter set; and
performing a conversion between the current video region and a bitstream of the video;
wherein the coefficient parameter syntax element is present in the bitstream independently from values of the first filtering coefficient set.

2. The method of claim 1, wherein the at least one filtering clipping syntax element is present in the bitstream in case that at least one value of the first filtering coefficient set is zero.

3. The method of claim 1, wherein the at least one filtering clipping syntax element is present in the bitstream regardless of the values of the first filtering coefficient set.

4. The method of claim 1, wherein the at least one filtering clipping syntax element and the at least one coefficient parameter syntax element are present in a same adaptive parameter set.

5. The method of claim 4, wherein the at least one filtering clipping syntax element includes a clipping index.

6. The method of claim 4, wherein the at least one coefficient parameter syntax element includes a coefficient absolute value.

7. The method of claim 4, wherein the at least one filtering clipping syntax element is coded with a fixed length of 2 bits and the at least one coefficient parameter syntax element is coded using Exponential-Golomb model with fixed order.

8. The method of claim 1, wherein the current video region includes a coding tree block or a slice.

9. The method of claim 1, wherein the at least one first filtering index is derived based on multiple sample differences in different directions.

10. The method of claim 9, wherein the current video region is split into multiple M*M video sub-region, and the multiple sample differences in different directions are derived for every M*M video sub-region, and wherein M is equal to 2 or 4.

11. The method of claim 10, wherein the multiple sample differences in different directions are derived based on 1:N subsampling rate, wherein N is great than 1.

12. The method of claim 1, wherein the conversion includes encoding the current video region into the bitstream.

13. The method of claim 1, wherein the conversion includes decoding the current video region from the bitstream.

14. An apparatus for processing video data comprising a processor and a non-transitory memory with instructions thereon, wherein the instructions upon execution by the processor, cause the processor to:
determine, that a non-linear filtering operation is applied for a current video region of a video;
generate at least one first filtering index for the current video region;
derive a first filtering coefficient set based on the at least one first filtering index and at least one coefficient parameter syntax element;
derive a first clipping parameter set based on the at least one first filtering index and at least one filtering clipping syntax element;
perform the non-linear filtering operation based on the first filtering coefficient set and the first clipping parameter set; and
perform a conversion between the current video region and a bitstream of the video;
wherein the coefficient parameter syntax element is present in the bitstream independently from values of the first filtering coefficient set.

15. The apparatus of claim 14, wherein the at least one filtering clipping syntax element is present in the bitstream in case that at least one value of the first filtering coefficient set is zero.

16. The apparatus of claim 14, wherein the at least one filtering clipping syntax element is present in the bitstream regardless of the values of the first filtering coefficient set.

17. A non-transitory computer-readable storage medium storing instructions that cause a processor to:
determine, that a non-linear filtering operation is applied for a current video region of a video;
generate at least one first filtering index for the current video region;
derive a first filtering coefficient set based on the at least one first filtering index and at least one coefficient parameter syntax element;
derive a first clipping parameter set based on the at least one first filtering index and at least one filtering clipping syntax element;
perform the non-linear filtering operation based on the first filtering coefficient set and the first clipping parameter set; and
perform a conversion between the current video region and a bitstream of the video;
wherein the coefficient parameter syntax element is present in the bitstream independently from values of the first filtering coefficient set.

18. A non-transitory computer-readable recording medium storing a bitstream of a video which is generated by a method performed by a video processing apparatus, wherein the method comprises:
determining, that a non-linear filtering operation is applied for a current video region of a video;
generating at least one first filtering index for the current video region;
deriving a first filtering coefficient set based on the at least one first filtering index and at least one coefficient parameter syntax element;
deriving a first clipping parameter set based on the at least one first filtering index and at least one filtering clipping syntax element;
performing the non-linear filtering operation based on the first filtering coefficient set and the first clipping parameter set; and
generating a bitstream of the video based on the non-linear filtering operation;
wherein the coefficient parameter syntax element is present in the bitstream independently from values of the first filtering coefficient set.

19. The non-transitory computer-readable recording medium of claim 18, wherein the at least one filtering clipping syntax element is present in the bitstream in case that at least one value of the first filtering coefficient set is zero.

20. The non-transitory computer-readable recording medium of claim 18, wherein the at least one filtering clipping syntax element is present in the bitstream regardless of the values of the first filtering coefficient set.

* * * * *